United States Patent
Howard et al.

(10) Patent No.: US 8,130,642 B2
(45) Date of Patent: *Mar. 6, 2012

(54) DOWNSTREAM SYNCHRONOUS MULTICHANNELS FOR A COMMUNICATIONS MANAGEMENT SYSTEM

(75) Inventors: Daniel H. Howard, Atlanta, GA (US); Niki R. Pantelias, Duluth, GA (US); David M. Pullen, Suwanee, GA (US); John D. Horton, Alpharetta, GA (US); Thomas J. Quigley, Jr., Franklin, GA (US); Richard S. Prodan, Boulder, CO (US)

(73) Assignee: Broadcom Corporation, Irvine, CA (US)

( * ) Notice: Subject to any disclaimer, the term of this patent is extended or adjusted under 35 U.S.C. 154(b) by 108 days.

This patent is subject to a terminal disclaimer.

(21) Appl. No.: 12/258,585

(22) Filed: Oct. 27, 2008

(65) Prior Publication Data

US 2009/0092153 A1   Apr. 9, 2009

Related U.S. Application Data

(63) Continuation of application No. 10/936,711, filed on Sep. 9, 2004, now Pat. No. 7,450,579.

(60) Provisional application No. 60/501,016, filed on Sep. 9, 2003.

(51) Int. Cl.
*H04L 12/26* (2006.01)

(52) U.S. Cl. ........................................ 370/230

(58) Field of Classification Search .................. None
See application file for complete search history.

(56) References Cited

U.S. PATENT DOCUMENTS

| | | | | |
|---|---|---|---|---|
| 6,516,192 B1 * | 2/2003 | Spaur et al. | ............ | 455/450 |
| 6,741,575 B1 * | 5/2004 | Zhang et al. | ............ | 370/329 |
| 7,412,212 B2 * | 8/2008 | Hottinen | ............ | 455/101 |
| 2002/0106029 A1 * | 8/2002 | Bunn et al. | ............ | 375/257 |
| 2002/0131425 A1 * | 9/2002 | Shalom | ............ | 370/401 |
| 2003/0206554 A1 * | 11/2003 | Dillon | ............ | 370/432 |
| 2004/0218623 A1 | 11/2004 | Goldenberg et al. | | |
| 2005/0135419 A1 | 6/2005 | Pullen et al. | | |

* cited by examiner

*Primary Examiner* — Raj Jain
(74) *Attorney, Agent, or Firm* — Sterne, Kessler, Goldstein & Fox P.L.L.C.

(57) ABSTRACT

Downstream synchronous multichannel (DSSM) communications are provided among a plurality of carriers, each being a completely DOCSIS™ 2.0-compliant downstream. The synchronous multichannels support communications with both DSSM-capable communications nodes and non-DSSM-capable communications nodes (e.g., legacy cable modems). Non-DSSM packets are transmitted on a single channel. DSSM packets are split into multiple pieces, which are transmitted simultaneously on all available channels. Since the physical delay variation (e.g., group delay change) across the adjacent carriers is small (on the order of a symbol time), the multiple pieces arrive at the receiving communications nodes at nearly the same time and can be reassembled with minimal buffering and no packet ordering problems. To avoid causing trouble for the non-DSSM-capable communications nodes, the packet pieces are encapsulated with a header that causes the non-DSSM-capable communications nodes to silently discard them.

36 Claims, 15 Drawing Sheets

| | | | | |
|---|---|---|---|---|
| Downstream channel A | DSSM seq #1 | DSSM seq #6 | legacy DOCSIS | DSSM seq #9 | etc... 104a |
| Downstream channel B | DSSM seq #2 | legacy DOCSIS | legacy DOCSIS | DSSM seq #7 | etc... 104b |
| Downstream channel C | DSSM seq #3 | DSSM seq #5 | legacy DOCSIS | legacy DOCSIS | etc... 104c |
| Downstream channel D | DSSM seq #4 | legacy DOCSIS | legacy DOCSIS | DSSM seq #8 | etc... 104d |

MPEG packet boundary * — MPEG packet boundary * — MPEG packet boundary * — MPEG packet boundary *

FIG. 13

DOWNSTREAM SYNCHRONOUS MULTICHANNELS FOR A COMMUNICATIONS MANAGEMENT SYSTEM

CROSS-REFERENCE TO RELATED APPLICATIONS

This application is a continuation of U.S. patent application Ser. No. 10/936,711, filed Sep. 9, 2004, now U.S. Pat. No. 7,450,579, which claims the benefit of U.S. Patent Application No. 60/501,016, filed Sep. 9, 2003, each of which is incorporated herein by reference in its entirety.

BACKGROUND OF THE INVENTION

1. Field of the Invention

The present invention relates generally to communications networking, and more specifically, to modulating bandwidth in a communications network.

2. Related Art

Conventional cable communications systems deploy a cable modem headend that manages communications with a plurality of cable modems. The headend defines the upstream and downstream operating characteristics that enable the cable modems to send carrier signals upstream to the headend and receive signals from the headend in the downstream. The upstream may consist of multiple channels that can be assigned to the cable modems. These channels are separated from each other by operating at different frequencies. However, the downstream typically consists of a single broadcast channel.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the pertinent art(s) to make and use the invention. In the drawings, like reference numbers indicate identical or functionally similar elements. Additionally, the leftmost digit(s) of a reference number identifies the drawing in which the reference number first appears.

FIG. 13 illustrates the scheduling of non-DSSM and DSSM packets, according to another embodiment of the present invention.

DETAILED DESCRIPTION OF THE INVENTION

I. Overview

According to embodiments of the present invention, a communications management system (such as a cable communications system) provides downstream synchronous multichannel (DSSM) communications with and among a supervisory communications node (such as a cable modem termination system (CMTS) for a headend controller) and a plurality of remote communications devices (such as cable modems). Devices or equipment having the capability to support DSSM communications are referred to herein as being "DSSM-capable." Devices or equipment lacking the capability to support DSSM communications are referred to herein as being "non-DSSM-capable." Non-DSSM devices or equipment include, for example, "legacy cable modems." As such, the present invention fully integrates the operation and/or management of legacy and DSSM-capable devices, both having the ability to communicate within the same communications management system.

Figure 1:
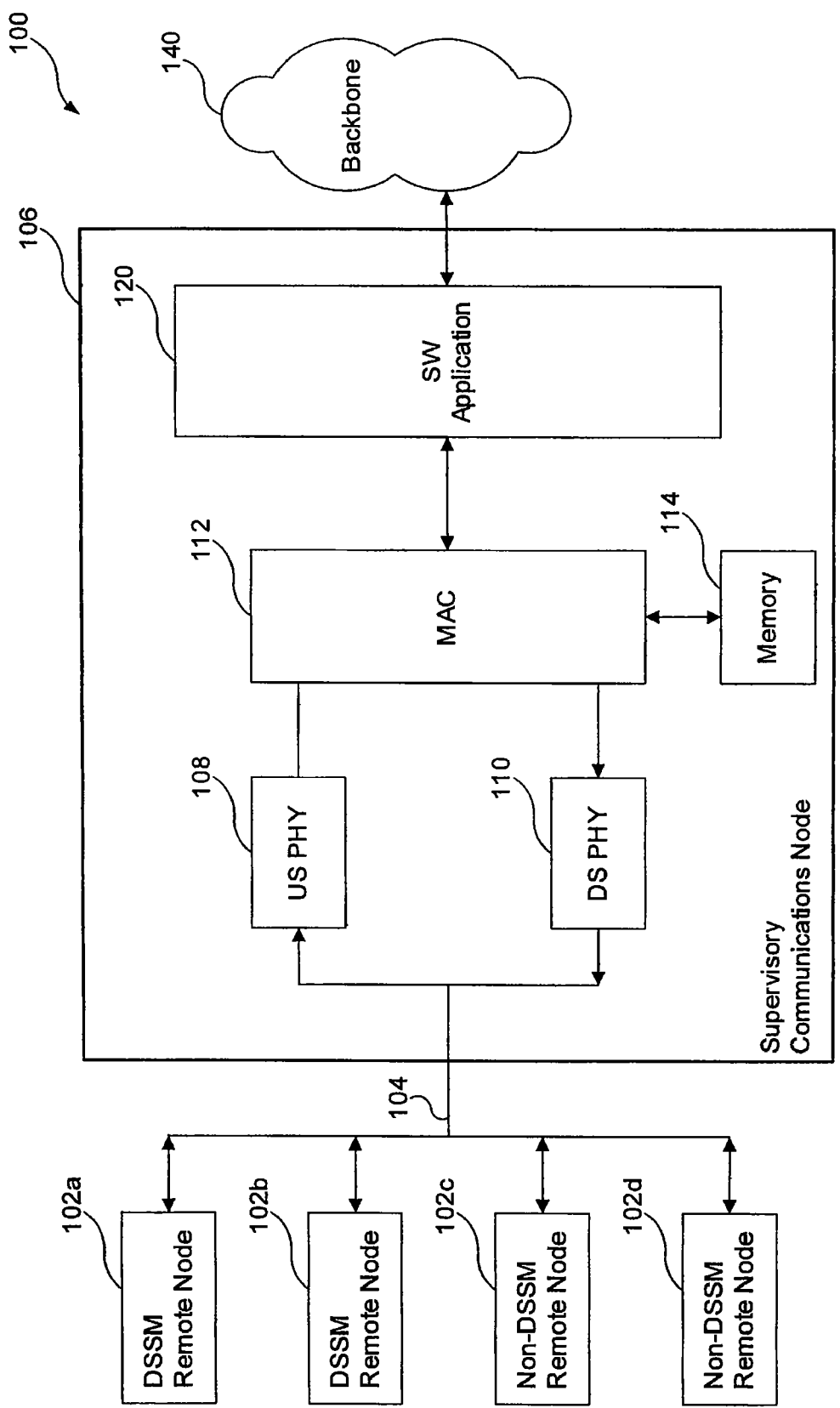
FIG. 1 illustrates a communications management system according to an embodiment of the present invention.

FIG. 1 illustrates a communications management system 100 according to an embodiment of the present invention. System 100 includes a supervisory communications node 106 and one or more widely distributed remote communications nodes 102a-102d (collectively referred to as "remote communications nodes 102"). System 100 can be implemented in any multimedia distribution network. Furthermore, it should be understood that the method and system of the present invention can manage the exchange of voice, data, video, audio, messaging, graphics, other forms of media and/or multimedia, or any combination thereof.

Supervisory communications node 106 is centrally positioned to command and control interactions with and among remote communications nodes 102. Supervisory communications node 106 manages upstream modulation and arbitrates bandwidth among remote communications nodes 102. Supervisory communications node 106 establishes the upstream slot structure and allocates upstream bandwidth by sending, for example, an upstream channel descriptor (UCD) message and MAP messages, respectively, to remote communications nodes 102. Supervisory communications node 106 also uses the MAP messages and slot count values to anticipate burst arrivals from remote communications nodes 102. In an embodiment, the UCD and MAP messages are defined by the CableLabs® Certified™ Cable Modem project (formerly known as Data Over Cable Service Interface Specification (DOCSIS™), which specifies the interface requirements for cable communications systems.

In an embodiment, supervisory communications node 106 is a component of a headend controller for a cable communications network. As such, supervisory communication node 106 is a CMTS or a part thereof. In an embodiment, supervisory communications node 106 includes up to four adjacent, six mega-Hertz (MHz) carriers, each of which taken individually is a completely DOCSIS™ 2.0-compliant downstream. The DOCSIS™ 2.0 standard is also defined by the aforementioned CableLabs® Certified™ Cable Modem project. It should be understood that the quantity of carriers and the carrier specifications can vary as determined by the system architect. For example, a plurality of eight MHz carriers can be included to conform with European standards.

In an embodiment, at least one remote communications node 102 is a cable modem or a part thereof. In another embodiment, supervisory communications node 106 is a CMTS and at least one remote communications node 102 is part of a television set-top box. As part of a cable modem, remote communications node 102 is configurable to transport one or more services to a subscriber. The services include telephony, television broadcasts, pay-for-view, Internet communications (e.g., WWW), radio broadcasts, facsimile, file data transfer, electronic mailing services (email), messaging, video conferencing, live or time-delayed media feeds (such as, speeches, debates, presentations, infomercials, news reports, sporting events, concerts, etc.), and/or the like.

Each remote communications node 102 is assigned one or more service identifier (SID) codes that supervisory communications node 106 uses to allocate bandwidth. A SID is used primarily to identify a specific flow from a remote communications node 102. However, as apparent to one skilled in the relevant art(s), other identifiers can be assigned to distinguish between the remote communications node 102 and/or the flow of traffic therefrom.

As discussed above, the present invention integrates the operation and/or management of non-DSSM and DSSM-capable communications nodes 102 within the same communications management system 100. In an embodiment, remote communications nodes 102a-102b are DSSM-capable, and remote communications nodes 102c-102d are non-DSSM-capable (e.g., legacy cable modems). The quantity of non-DSSM and/or DSSM-capable remote communications nodes 102 can vary as determined by the system architect. The four remote communications nodes 102, depicted in FIG. 1 and described herein, are provided for illustrative purposes. More or less remote communications nodes 102 can be implemented.

In an embodiment, supervisory communications node 106 and remote communications nodes 102 are integrated to support protocols such as Internet Protocol (IP), Transmission Control Protocol (TCP), User Datagram Protocol (UDP), Real Time Transport Protocol (RTP), Resource Reservation Protocol (RSVP), or the like.

Communications management system 100 also includes an internodal infrastructure 104. As shown in FIG. 1, internodal infrastructure 104 provides interconnectivity among supervisory communications node 106 and remote communications nodes 102. Internodal infrastructure 104 supports wired, wireless, or both transmission media, including satellite, terrestrial (e.g., fiber optic, copper, twisted pair, coaxial, hybrid fiber-coaxial (HFC), or the like), radio, microwave, free-space optics, and/or any other form or method of transmission.

All communications transmitted in the direction from supervisory communications node 106 towards remote communications nodes 102 are referred to as being in the downstream. In an embodiment, the downstream is divided into one or more downstream channels. Each downstream channel is configured to carry various types of information to remote communications nodes 102. Such downstream information includes television signals, data packets (IP datagrams), voice packets, control messages, and/or the like. In an embodiment, the downstream is formatted with a motion picture expert group (MPEG) transmission convergence sublayer. However, the present invention can be configured to support other data formats as would be apparent to one skilled in the relevant art(s).

The upstream represents all communications from remote communications nodes 102 towards supervisory communications node 106. The upstream is divided into one or more upstream channels. Each upstream channel carries bursts of packets from remote communications nodes 102 to supervisory communications node 106. In the upstream, each channel is broken into multiple assignable slots, and remote communications nodes 102 send a burst signal in an assigned slot. As discussed above, the slot structure is defined and assigned by supervisory communications node 102.

As shown in FIG. 1, an embodiment of supervisory communications node 106 includes an upstream physical layer demodulator (US PHY) 108, a downstream physical layer modulator (DS PHY) 110, a media access controller (MAC) 112, a memory 114, and a software application 120. US PHY 108 forms the physical layer interface between supervisory communications node 106 and the upstream channels of internodal infrastructure 104. Hence, US PHY 108 receives and demodulates all bursts from remote communications nodes 102.

Conversely, DS PHY 110 forms the physical layer interface between supervisory communications node 106 and the downstream channel(s) of internodal infrastructure 104. Hence, voice, data (including television or radio signals) and/or control messages that are destined for one or more remote communications nodes 102 are received at DS PHY 110 and transmitted to the respective remote communications nodes 102. DS PHY 110 modulates and/or formats the information for downstream transmission.

MAC 112 receives the upstream signals from US PHY 108 or provides the downstream signals to DS PHY 110, as appropriate. MAC 112 operates as the lower sublayer of the data link layer of supervisory communications node 106. In embodiments, MAC 112 supports fragmentation, concatenation, payload header suppression/expansion, and/or error checking for signals transported over the physical layer (i.e., internodal infrastructure 104).

Memory 114 interacts with MAC 112 to store the signals as they are processed by MAC 112. Memory 114 also stores various auxiliary data used to support the processing activities. Such auxiliary data includes security protocols, identifiers, rules, policies, or the like, as described in greater detail below.

MAC 112 is interfaced to software application 120. Software application 120 operates on one or more processors (or hardware assist devices, such as a field-programmable gate array (FPGA) or application-specific integrated circuit (ASIC)) to receive control messages, voice, and/or data from MAC 112 and implement further processing. In an embodiment, software application 120 includes a classifier/router and a bandwidth (BW) allocation controller. The BW allocation controller manages upstream and/or downstream modulation and bandwidth allocation. The classifier/router provides rules and policies for classifying and/or prioritizing communications with remote communications nodes 102. The classifier/router also routes signals from remote communications nodes 102 to a destined location over backbone network 140.

Backbone network 140 is part of a wired, wireless, or combination of wired and wireless local area networks (LAN), wide area networks (WAN), and/or optical networks (such as, an organization's intranet, local internets, the global-based Internet (including the World Wide Web (WWW)), virtual private networks, and/or the like). Supervisory communications node 106 utilizes backbone network 140 to communicate with another device or application external to communications management system 100. The device or application can be a server, web browser, operating system, other types of information processing software (such as word processing, spreadsheets, financial management, or the like), television or radio transmitter, another remote communications node 102, another supervisory communications node 106, or the like.

II. Operational Flow for DSSM Communications

In an embodiment, communications management system 100 includes methodologies and/or techniques for mixing the traffic for non-DSSM-capable remote communications nodes 102c-102d and DSSM-capable remote communications nodes 102a-102b. This can be described with reference to FIG. 2, in which flowchart 200 illustrates the general operational flow of an embodiment of the present invention. More specifically, flowchart 200 shows an example of a control flow for transmitting a DSSM packet to a non-DSSM-capable and/or DSSM-capable remote communications node 102.

The control flow of flowchart 200 begins at step 201 and passes immediately to step 203. At step 203, a packet is accessed for downstream processing. Supervisory communications node 106 receives information (including control messages and data from, for example, subscriber services) that has been designated to be packetized and transmitted to an end-user communicatively coupled to a remote communications node 102.

At step 206, protocol processing is performed to prepare the packet for the downstream. Protocol processing includes payload header suppression, data encryption standard (DES) encryption, and/or the like. In an embodiment, the protocol processing complies with the requirements of the DOCSIS™ 2.0 protocol, which includes the creation of a "regular" DOCSIS™ header with extended headers (EHDRs), header checksum (HCS), and/or the like. As discussed above, protocol processing can be performed by MAC 112.

At step 209, it is determined whether the packet will be sent to a DSSM-capable remote communications node(s) 102a-102b or to a non-DSSM-capable remote communications node(s) 102c-102d. For a non-DSSM-capable packet, the control flow passes to step 212. Otherwise, control passes to step 218.

At step 212, the non-DSSM packet is framed and encapsulated. In an embodiment, an encapsulation header is created to mark the packet as being a non-DSSM packet. Thus, the original packet is "encapsulated" behind the new "outer" header.

At step 215, the packet is transmitted on a single channel in the downstream (i.e., over internodal infrastructure 104) to all remote communications nodes 102.

At step 218, the packet is prepared for a DSSM transmission. The packet is split into a predesignated quantity of pieces. In an embodiment, the predesignated quantity matches the quantity of available downstream channels. As discussed above in reference to FIG. 1, supervisory communications node 106 includes four carriers in communications with four remote communications nodes 102. As such, four downstream channels are available in communications system 100 for the DSSM-capable remote communications nodes 102a-102b. Although the present invention is described with reference to four identical channels for illustrative purposes, the quantity of channels can vary as determined by the system architect. More or less channels can be implemented.

In an embodiment, byte-level splitting is used to produce the predesignated quantity of pieces. As such, the packet from step 209 is divided, one byte at a time, over the four available channels in the order it is received. For example, the first byte of the packet becomes the first byte of the protocol data unit (PDU) for channel 0, the second byte of the packet becomes the first byte of the PDU for channel 1, the third byte of the packet becomes the first byte of the PDU for channel 2, the fourth byte goes to channel 3 in the same way, the fifth byte of the original packet then becomes the second byte of the PDU for channel 0, the sixth byte goes to channel 1, and so forth. The result is four "pieces", one for each of the four available channels, all with lengths within a byte of each other.

In another embodiment, packet-level splitting is used to produce the predesignated quantity of pieces. As such, the packet from step 209 is divided into four units of MPEG packets. For example, a first portion (e.g., the first 183 bytes of the packet) becomes the PDU for channel 0, the next portion (e.g., the next 183 bytes) becomes the PDU for channel 1, and so forth. Each unit, representing a "piece", is sent at the same time on the four available channels. In another embodiment, if packet-level splitting is implemented, PDUs may be the same size but synchronization requirements across channels may be relaxed at the expense of increased buffering in the remote communications nodes 102.

Byte-level splitting and packet-level splitting are described herein by way of example, and not limitation. Other splitting techniques can be implemented in other embodiments of the present invention, and can be used to produce a plurality of packet pieces to be sent at substantially the same time over a plurality of available channels. It is assumed that the four channels are all identical (e.g., same baud rate, modulation order, and interleaver settings). If the available channels are not identical, the bytes are assigned to the channels in a well-defined order such that reconstruction is deterministic and all pieces take substantially the same amount of time to send on the downstream. In an embodiment, bytes are assigned to each channel relative to the channel rates, instead of the "round robin" assignment described above. For example if byte-level splitting is implemented and if channel B is twice as fast as channel A, one byte would be sent on channel B, followed by two bytes on channel A, followed by one byte on channel B, and so forth. The exact ordering of bytes on the channels can be specified in a similar manner for any ratio of channel bandwidths. If packet-level splitting is implemented and if channel B is twice as fast as channel A, the byte size for the PDU being sent on channel B is twice the byte size of the PDU being sent on channel A.

At step 221, each piece is framed and encapsulated as a DSSM packet. In an embodiment, an encapsulation header is created to designate the channel that the bytes, within the piece, have been assigned. Thus, each of the four pieces is "encapsulated" behind their respective new "outer" header.

At step 224, the four pieces are transmitted simultaneously on all four channels of the downstream. These pieces are transmitted beginning at the same time (as indicated by the timestamp count or other suitable reference) on all four channels. A deterministic padding algorithm is used to make each piece take the same amount of time to transmit, in order to guarantee that the next packet can also start at the same time on each channel.

At step 227, if additional packets are received for the downstream, the control flow returns to step 203, and the process is repeated. Otherwise, the control flow ends as indicated by step 295.

As discussed, DSSM and non-DSSM packets are encapsulated to distinguish DSSM packets from non-DSSM packets and/or identify the downstream channel for transmitting a DSSM packet piece. Therefore, the present invention includes a mechanism for mixing the traffic for DSSM-capable remote communications nodes 102a-102b and non-DSSM-capable remote communications nodes 102c-102d. The mixing mechanism enables the DSSM traffic to be silently discarded by non-DSSM-capable remote communications nodes 102c-102d. As a result, the packets for the DSSM-capable remote communications nodes 102a-102b would not cause problems for non-DSSM-capable remote communications nodes 102c-102d, such as legacy cable modems.

In an embodiment, the mixing mechanism of the present invention is implemented by using a "reserved" FC type field in an encapsulation header. The FC type field is defined in the DOCSIS™ 1.1 and 2.0 specifications as being "reserved for future use." If the two-bit FC type of a header is denoted as "2'b10", a DOCSIS™ 1.1 and 2.0 cable modem is required to silently discard the packet by using the length field to skip over the PDU. As such, a "2'b10" designation in the FC type field of an encapsulation header is used to mark a packet as being a DSSM packet. This mixing mechanism can be explained with reference to FIG. 3.

Figure 3:
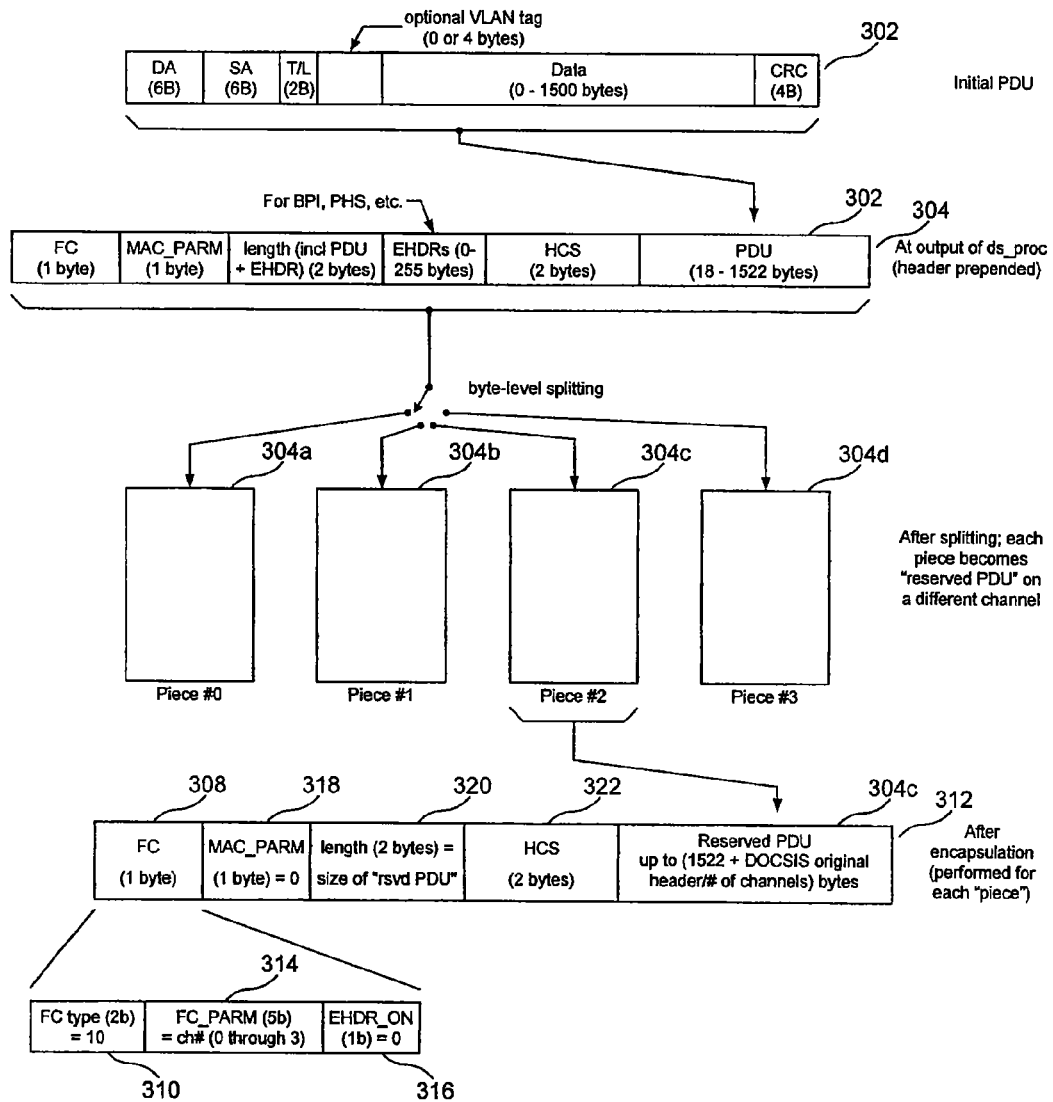
FIG. 3 illustrates MAC-layer packet formats for various layers of a DSSM packet, according to an embodiment of the present invention.

FIG. 3 illustrates MAC-layer packet formats for various layers of a DSSM packet 312, according to an embodiment of the present invention. As shown, an initial PDU 302 is accessed to be prepared for the downstream, as discussed above with reference to the step 203. PDU 302 includes a data field, a destination address (DA), source address (SA), type and length field (T/L) that either specifies the quantity of bytes in the payload or indicates the type of payload, and a cyclical redundancy check (CRC) value that has been calculated for error checking.

During protocol processing (e.g., at step 206), a header is created for PDU 302 that includes information for frame control (FC), MAC parameter (MAC_PARM), length (LEN) of PDU 302 and the protocol header, EHDR, and HCS. Upon completion of protocol processing, the resulting packet 304 is split into a predesignated quantity of pieces 304a-304d. As discussed with reference to step 218, byte-level splitting is used in an embodiment to produce the pieces 304a-304d based on a round robin assignment or another technique that ensures all pieces 304a-304d take substantially the same amount of time to be transmitted downstream.

As shown in FIG. 3, an encapsulation header is created for piece 304c to mark it as being a DSSM packet 312. Thus, each piece 304a-304d receives an encapsulation header that includes information for a MAC_PARM field 318, a LEN field 320, a HCS field 322, and the PDU representing the respective piece 304a-304d. The encapsulation header also includes a FC field 308 that specifies whether the piece 304a-304d is a DSSM packet 312 or not. As discussed above, a "reserved" FC type field 310 is denoted as "2'b10" to mark a packet as being a DSSM packet 312. FC field 308 also includes information for a frame control parameter (FC_PARM) 314 that specifies which available downstream channel the piece 304a-304c has been assigned (as discussed above at step 218). FC field 308 also includes an EHDR field 316 that indicates whether an EHDR is present.

Therefore, a DSSM packet 312 in accordance with an embodiment of the present invention is the by-product of a packet 304 being split into a designated quantity of pieces (e.g., 304a-304d) and encapsulated with the following information. The FC type 310 is set to "10", the FC_PARM 314 indicates the assigned downstream channel (e.g., channel number 0, 1, 2, or 3), the EHDR field 316 indicates that no EHDR is present, the MAC_PARM field 318 is set to "0", the LEN field 320 indicates the size of PDU for the piece 304a-304d, and the HCS field 322 is specified as usual.

Conversely, a non-DSSM packet, according to an embodiment of the present invention, is encapsulated with a header that specifies the FC type 310 as being any value except for "10". For example, the FC type 310 for a non-DSSM packet can be set to "0", "reserved", or the like.

As described, an FC type field (e.g., FC type 310) provides a mixing mechanism for the present invention when byte-level splitting is utilized to split a packet (e.g., packet 304) into a predesignated quantity of pieces (e.g., pieces 304a-304d). In another embodiment, the mixing mechanism of the present invention is implemented by using a program identifier (PID) in an MPEG transport/encapsulation header. The PID field is defined in the DOCSIS™ 1.1 and 2.0 specifications as being "0x1FFF" to designate a legacy packet (i.e., non-DSSM packet). If the thirteen-bit PID field is denoted as any value other than "0x1FFF", a DOCSIS™ 1.1 and 2.0 cable modem is required to silently discard the packet. As such, a "0x1FFF" designation in the PID field of an encapsulation header is used to mark a packet as being a non-DSSM packet. Any other designation in the PID field is used to mark a packet as being a DSSM packet. This mixing mechanism can be explained with reference to FIG. 4.

Figure 4:
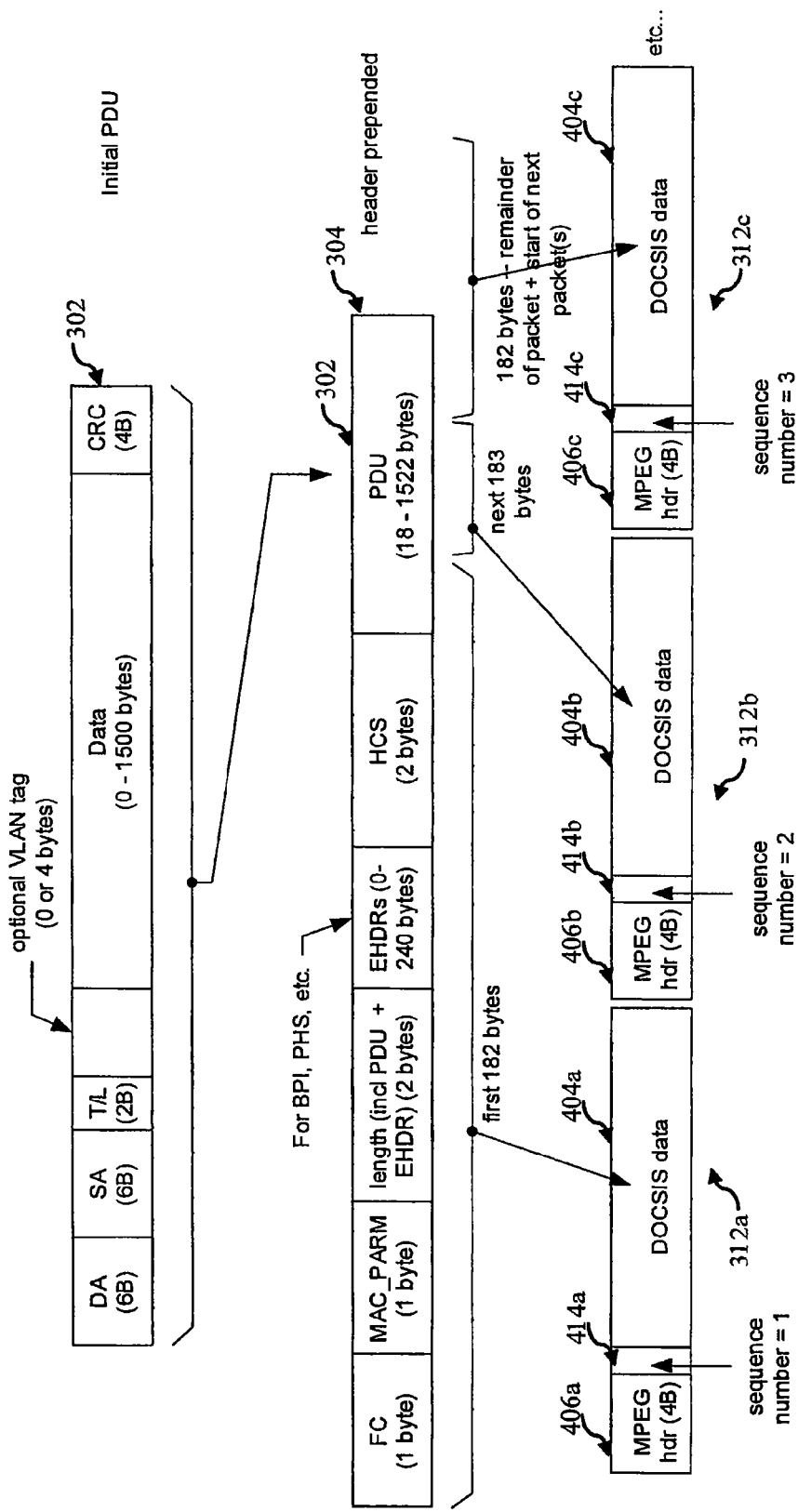
FIG. 4 illustrates MAC-layer packet formats for various layers of a DSSM packet, according to another embodiment of the present invention.

FIG. 4 illustrates MAC-layer packet formats for various layers of a DSSM packet 312, according to another embodiment of the present invention. As shown, an initial PDU 302 is accessed to be prepared for the downstream, as discussed above with reference to the step 203. During protocol processing (e.g., at step 206), a header is created for PDU 302 to produce the resulting packet 304, which is, thereafter, split into a predesignated quantity of pieces 404a-404c. In this example, packet-level splitting is implemented (as discussed above with reference to step 218) to produce the pieces 404a-404c.

As shown in FIG. 4, an encapsulation header is created for each piece 404a-404c to mark it as being a DSSM packet 312. Each piece 404a-404c receives an encapsulation header that includes an MPEG header 406a-406c (referred collectively herein as MPEG header 406) and a sequence number 414a-414c (referred collectively herein as sequence number 414). MPEG header 406 is produced during a MPEG framing step, which allows the packet splitting to take advantage of an existing MPEG frame structure. The sequence number 414 is actually the first byte of the PDU (i.e., piece 404a-404c), and represents the ordering of the resulting DSSM packets 312a-312c. Sequence number 414 is similar to the FC_PARM 314 (describe above with reference to byte-level splitting) and is used to help determine packet ordering for reassembly.

Figure 5:
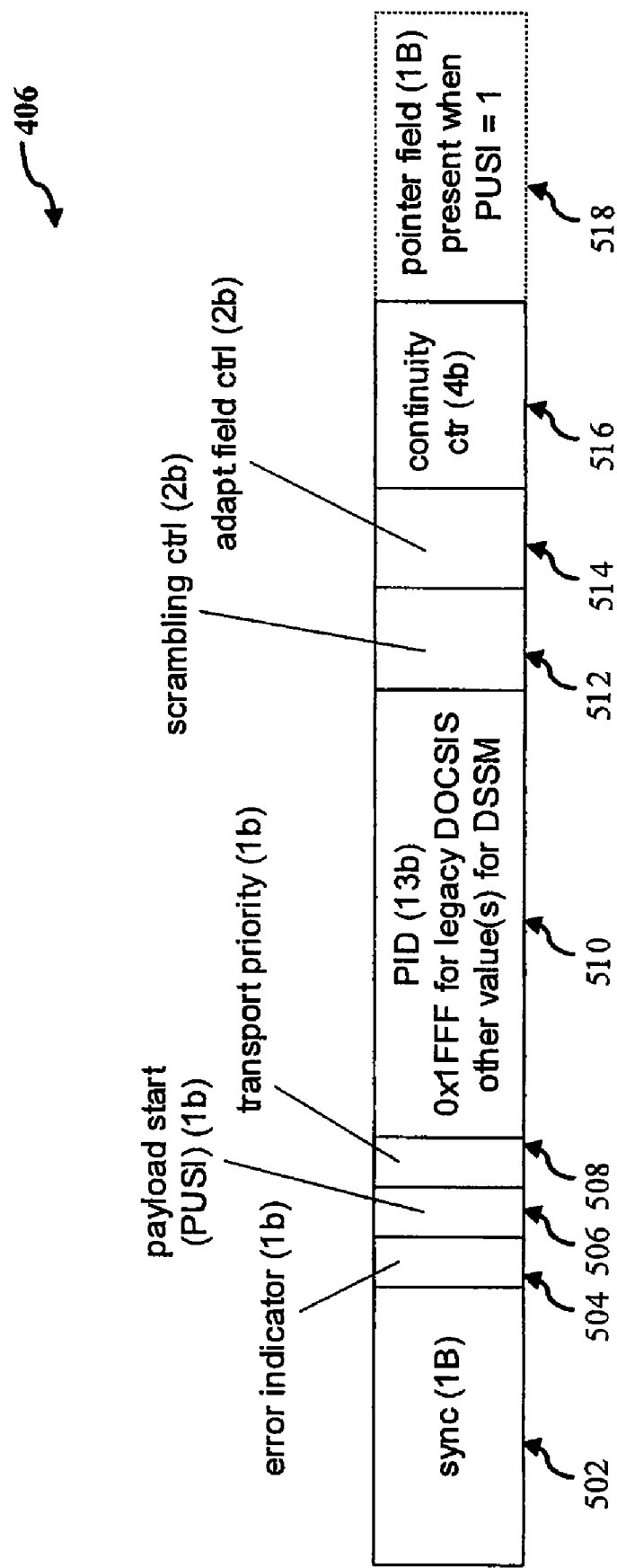
FIG. 5 illustrates an MPEG header for a MAC-layer packet, according to an embodiment of the present invention.

FIG. 5 illustrates an embodiment of MPEG header 406 that is useful for implementing aspects of the present invention. MPEG header 406 a synchronization byte 502, a transport error indicator 504, a payload unit start indicator (PUSI) 506, a transport priority 508, a PID 510, a transport scrambling control 512, an adaptation field control 514, a continuity counter 516, and a pointer field 518.

Synchronization byte 502 is a one-byte field that generally contains the value "0x47". However, some PHY layer coding schemes (e.g., J.83 Annex A) may modify this value.

Transport error indicator 504 is a one-bit field that is used for error detection. A sending device transmits zero for this bit, and a receiving device can set the field to one, if the receiving device detects errors in the packet (e.g., packet 312).

PUSI 506 is a one-bit field. When set, PUSI 506 indicates that pointer field 518 is present and points to the location within a packet (e.g., packet 312) where a new DOCSIS™ frame may begin.

Transport priority 508 is a one-bit field that is generally set to zero because it is not used by a DOCSIS™-compliant system.

PID 510 is a thirteen-bit field. As discussed above, PID 510 is set to "0x1FFF" for a DOCSIS™ 1.x and/or 2.0 system. This value therefore designates a non-DSSM packet (e.g., legacy packet). If PID 510 contains any value other than "0x1FFF", the packet (e.g., packet 312) is designated as a DSSM packet. The DSSM value for PID 510 can be any publicly assigned value, or something configurable on different systems. If the value of PID 510 is not "0x1FFF", a legacy cable modem would ignore the packet (similarly to the way a packet is discard if the two-bit FC type field 314 is denoted as "2'b10" as described above for byte-level splitting).

Transport scrambling control 512 is a two-bit field that is not used in a DOCSIS™-compliant system, and is therefore generally set to zero.

Adaptation field control 514 is a two-bit field. For a DOCSIS™-compliant system, adaptation field control 514 contains the value "01b", which (according to the telecommunications standard defined by ITU-T Rec. H.222 for video transport) indicates that no adaptation field is present.

Continuity counter 516 is a cyclic counter that increments by one for each packet (e.g., packet 312) sent using this four-bit field.

Pointer field 518 is a one-byte field. In accordance with the DOCSIS™ specifications, pointer field 518 contains the number of bytes in the packet (e.g., packet 312) that immediately follow pointer field 518 that a receiving decoder (e.g., remote communications nodes 102a-102d) must skip past before looking for the beginning of a DOCSIS™ MAC frame. Pointer field 518 is only present if the PUSI bit 506 is set.

When pointer field 518 is present, the payload (e.g., piece 404a and sequence number 414a) contains 183 bytes. Referring back to FIG. 4, piece 404a contains 182 bytes and sequence number 414a contains one byte. If, on the other hand, there is no pointer field 518, the payload contains 184 bytes. Referring once again to FIG. 4, piece 404b contains 183 bytes and sequence number 414b contains one byte. Thus, in an embodiment, the total size of a MPEG packet (e.g., packet 312), including header 406, is always 188 bytes. According to DOCSIS™, the payload data contains "stuff bytes" (0xFF) when there is no data to send.

Therefore, a DSSM packet 312 produced from packet-level splitting is the by-product of a packet 304 being split into a designated quantity of pieces (e.g., 404a-404c) and encapsulated with the following information. The PID 510 is set to any value other than "0x1FFF", and the sequence number 414a-414c indicates the ordering for reassembling the resulting DSSM packets 312a-312c. Conversely, a non-DSSM packet, according to an embodiment of the present invention, is encapsulated with a header that specifies the PID 510 as set "0x1FFF".

Referring to FIGS. 1-5, the encapsulation header is created on all four downstream channels of internodal infrastructure 104. As such, a packet 304 is divided for DSSM transmission, at step 218 over the four channels in the order they are numbered in the FC_PARM field 314, sequence number 414, or the like. As discussed, four channels have been shown and described for illustrative purposes. In other embodiments of the present invention, more or less channels are implemented, as determined by the system architect.

Figure 6:
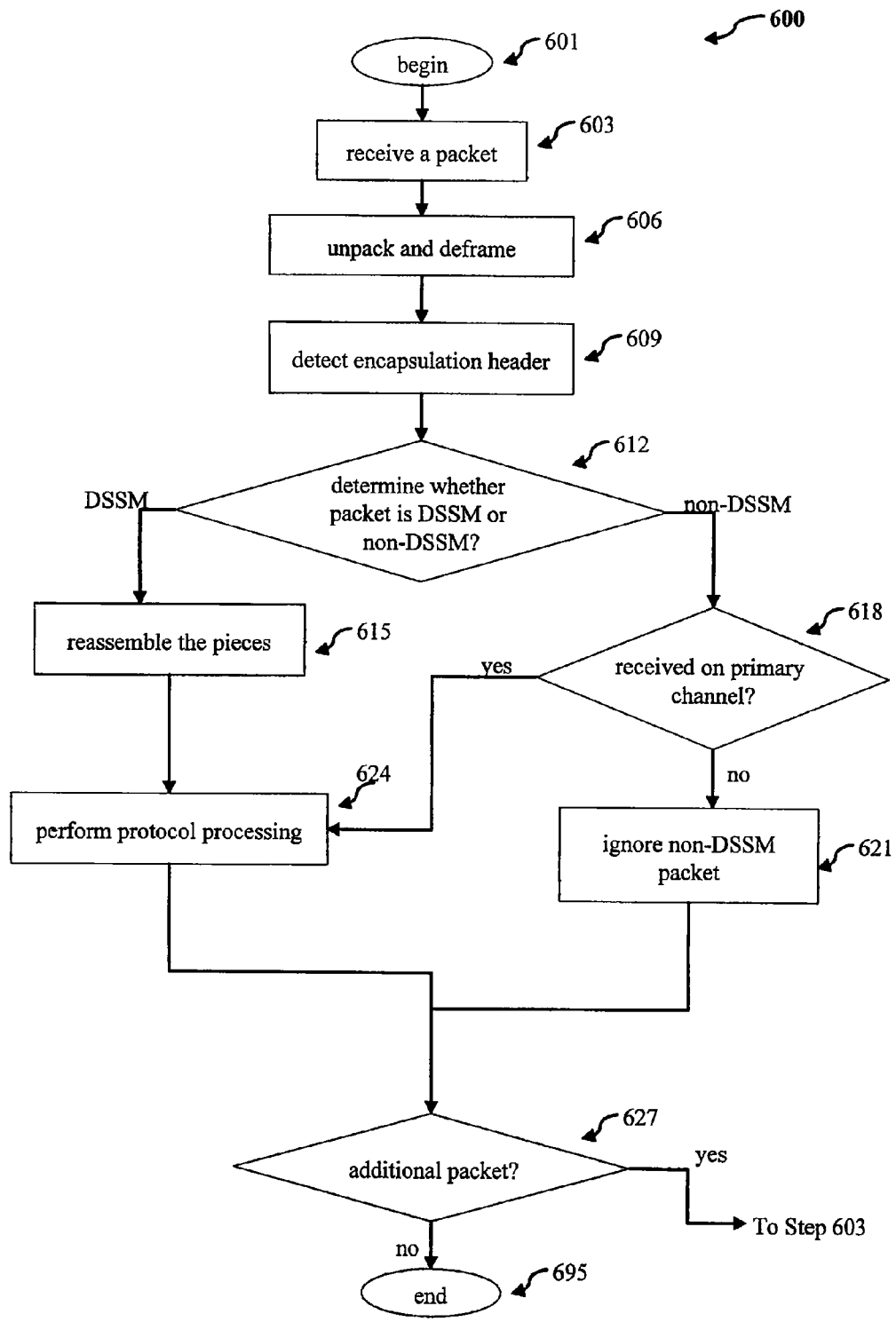
FIG. 6 illustrates an operational flow for receiving a downstream packet according to an embodiment of the present invention.

Upon transmission of the encapsulated DSSM or non-DSSM packet, the packet is received and processed by remote communications nodes 102. Referring to FIG. 6, flowchart 600 represents the general operational flow of an embodiment of the present invention for receiving a downstream packet. More specifically, flowchart 600 shows an example of a control flow for receiving a downstream packet at a DSSM-capable remote communications node 102a-102b.

The control flow of flowchart 600 begins at step 601 and passes immediately to step 603. At step 603, a packet is accessed from the one or more of the four downstream channels of internodal infrastructure 104. If the packet is a non-DSSM packet, the packet would arrive from one of the four downstream channels, as discussed in greater detail below.

If the packet is a DSSM packet (e.g., DSSM packet 312), four pieces (e.g., pieces 304a-304d or 404a-404c) of the original packet (e.g., packet 304) would arrive from the four downstream channels. Since the physical delay variation (e.g., group delay change) across four adjacent carriers is small (on the order of a symbol time), the four pieces arrive at the destined remote communications nodes 102 at substantially the same time. In other words, the four PHYs for a remote communications node 102 would independently receive four DSSM packet pieces at substantially the same time (to within a symbol period plus any variation introduced by the PHY implementations).

At step 606, the packet is unpacked and deframed. At step 609, the encapsulation header is detected. In an embodiment, a header parser detects the FC type field 310, PID 510, or the like, as discussed above.

At step 612, it is determined whether the packet is a DSSM packet or a non-DSSM packet. In an embodiment using byte-level splitting, if the FC type field is set to 10, the packet is determined to be a DSSM packet, and the control flow passes to step 615. In an embodiment using packet-level splitting, the packet is determined to be a DSSM packet if PID 510 is set to any value other than "0x1FFF", and the control flow passes to step 615. Otherwise, the packet is determined to be a non-DSSM packet, and the control flow passes to step 618. Therefore, the present invention includes a mechanism for allowing, for example, a DSSM-capable cable modem to receive legacy packets.

At step 615, the individual pieces (e.g., 304a-304d or 404a-404c) are reassembled with minimal buffering and no packet ordering problems. In an embodiment using byte-level splitting, a byte is pulled from the PDU of each channel in the order indicated by the FC_PARM bits (e.g., FC_PARM field 314) to reconstruct the original packet (e.g., packet 304). In an embodiment using packet-level spitting, the sequence number 414 is utilized to reassemble the PDU into the original packet (e.g., packet 304).

At step 624, the resulting byte stream is sent to a MAC, within remote communications node 102, for protocol processing while it is being constructed. Therefore, there is no need to buffer the entire packet before sending it to the MAC. During protocol processing, HCS and CRC checking are performed on the reconstructed packet just as if it had been received on a single carrier, and the encapsulation header also gets its HCS checked. Any receiver errors (e.g., FEC errors) on any of the channels result in an HCS or CRC failure for the complete reconstructed frame, thus causing the entire frame to be dropped. If the CRC and HCS checks pass, the reconstructed frame continues to normal MAC layer processing, including, for example, header parsing, DES decryption, payload header suppression (PHS) expansion, and/or the like.

At step 618, non-DSSM packets are processed by the DSSM-capable remote communications node 102a-102b. To limit buffering requirements and avoid the complexity of a "network-layer multichannel," a provisioning mechanism is provided to make one of the four downstream channels of remote communications node 102a-102b the "primary downstream" (e.g., the channel on which it listens for legacy packets that pass its SID and DA filters).

Thus, if the non-DSSM packet is received on the primary downstream channel, the control flow passes to step 624, and the packet is sent to the MAC for protocol processing. Having the ability to receive legacy packets allows DSSM-capable cable modems to receive management messages in "legacy" format (i.e., no duplication of MAP or UCD messages is needed for the DSSM-capable cable modems vs. earlier DOCSIS™ cable modems) and also listen in on multicast or broadcast streams intended for both legacy and DSSM-capable cable modems, which provides more statistical multiplexing benefits.

On the other hand if the non-DSSM packet is not received on the primary downstream channel, the control flow passes to step 621. At step 621, the non-DSSM packet is completely ignored.

At step 627, if additional packets are received from the downstream, the control flow returns to step 603, and the process is repeated. Otherwise, the control flow ends as indicated by step 695.

Figure 7:
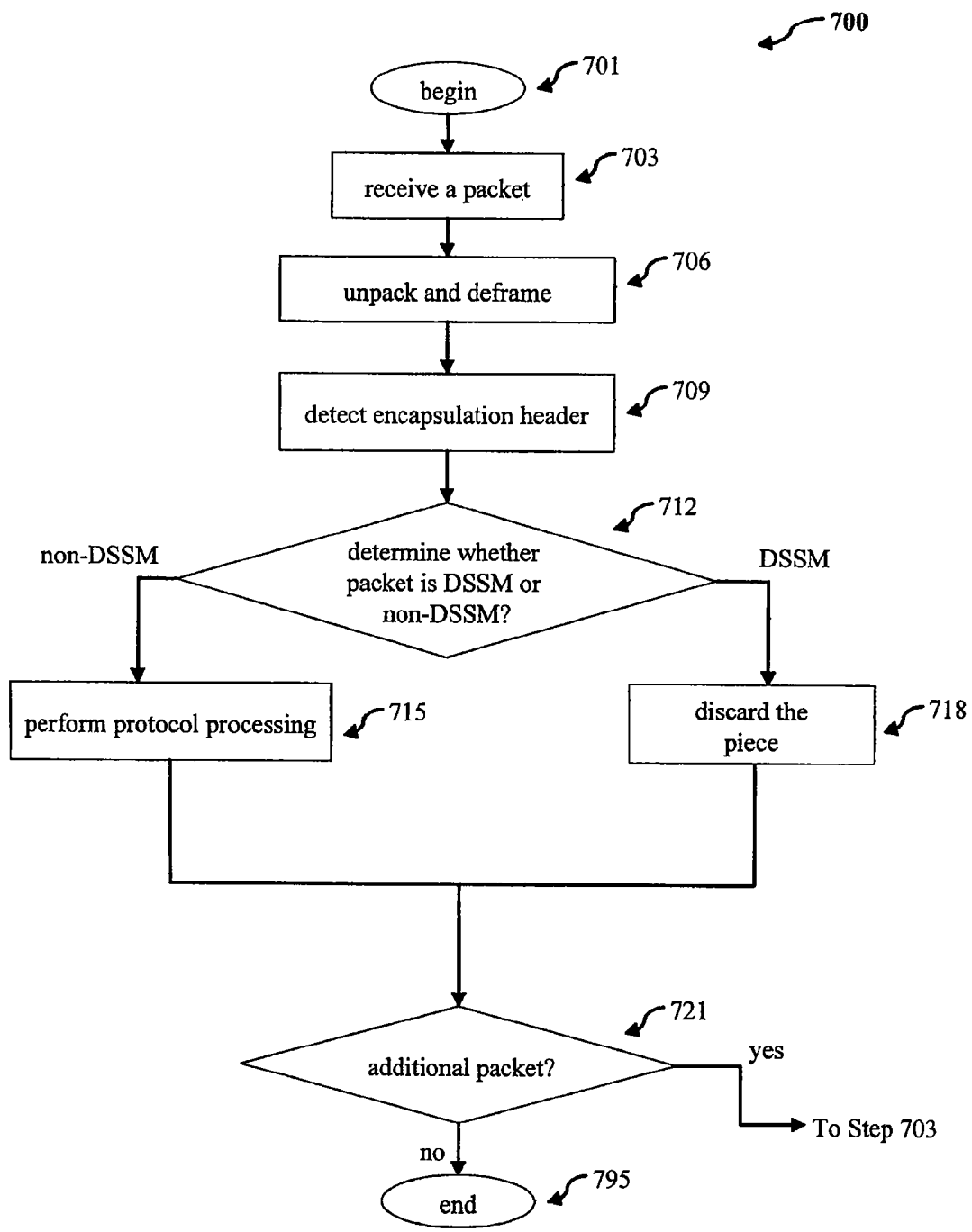
FIG. 7 illustrates an operational flow for receiving a downstream packet according to another embodiment of the present invention.

Referring to FIG. 7, flowchart 700 represents the general operational flow of another embodiment of the present invention for receiving a downstream packet. More specifically, flowchart 700 shows an example of a control flow for receiving a downstream packet at a non-DSSM-capable remote communications node 102c-102d.

The control flow of flowchart 700 begins at step 701 and passes immediately to step 703. At step 703, a packet is accessed from the downstream. At step 706, the packet is unpacked and deframed. At step 709, the encapsulation header is detected. At step 712, it is determined whether the packet is a non-DSSM packet or a DSSM packet. If it is determined to be a non-DSSM packet, the control flow passes to step 715. Otherwise, the control flow passes to step 718.

At step 715, protocol processing is performed on the non-DSSM packet. The protocol processing includes HCS and CRC checking, header parsing, DES decryption, PHS expansion, and/or the like.

At step 718, the DSSM packet is silently discarded. As discussed above, the pieces (e.g., pieces 304a-304d or 404a-404c) are encapsulated with a header that marks the packet as being a DSSM packet (e.g., DSSM packet 312). When a DSSM packet is received by a non-DSSM capable remote communications node 102c-102d and if byte-level splitting is used to produce the DSSM packet, the reserved FC type field 310 instructs the remote communications node 102c-102d to use the LEN field 320 of the encapsulation header to discard the entire DSSM packet. If packet-level splitting has been used to produce the DSSM packet, PID 410 instructs the remote communications node 102c-102d to discard the entire DSSM packet. Discarding the DSSM packet avoids causing any trouble for, for example, a legacy cable modem. The legacy cable modem's PHY sees completely valid bits, so it continues to track, but these bits go directly to a bit bucket and do not affect the legacy cable modem's operation in any way.

At step 721, if additional packets are received from the downstream, the control flow returns to step 703, and the process is repeated. Otherwise, the control flow ends as indicated by step 795.

As discussed above, the multiple pieces (e.g., pieces 304a-304d or 404a-404c) encapsulated as DSSM packets (e.g., DSSM packet 312) arrive at the DSSM-capable remote communications nodes 102a-102b at substantially the same time. Any variation in the arrival time of the multiple pieces at their respective remote communications nodes 102a-102b translates directly into additional buffering space at the remote communications nodes 102a-102b. The present invention includes mechanisms for keeping any arrival time variation to a minimum. On identical downstream channels, this can be accomplished by requiring that MPEG frames, SYNC message location, and FEC frames be synchronized across the channels.

However, if the channels are not identical, several approaches are available for minimizing arrival time variation. First, differing modulation orders and baud rates would make it difficult to synchronize MPEG frames across channels. From the point of view of the "reconstruction" function of the DSSM-capable remote communications node 102a-102b, this means that MPEG headers would "interrupt" the received byte streams from the different channels at different times. This could be overcome by adding sufficient buffering to take up the resulting variation. Since the MPEG header is only four or five bytes, this solution is generally acceptable.

Second, differing modulation orders and baud rates would also prohibit perfect synchronization of SYNC messages across the downstream channels, since the message would take a different amount of time to send on different channels. In addition, since SYNC messages are not allowed to cross MPEG frame boundaries, it may be difficult for supervisory communications node 106 to find a time when it is possible to start a SYNC message on all four channels at once. A SYNC message is thirty-four (34) bytes long, so the buffering needed on each downstream channel to take up this variation would be about that size.

Third, different modulation orders also call for slightly different FEC framing structures, which cannot be synchronized across downstream channels. Fortunately, the resulting variation in arrival time is still relatively small (84 bits at a time is the maximum) so adding buffering is probably a viable solution.

Fourth, if the interleaver settings are not identical across channels, the delay variation can be significant (on the order of several milliseconds, or more if more interleaver depth is added to support 1024 QAM). This variation can be far too large to be addressed by buffering at the remote communications node 102a-102b. One solution is to account for it at the "splitting" function of the supervisory communications node 106 by "offsetting" the transmission time of the pieces so that their arrival time at the remote communications node 102a-102b is almost identical. This works great for the receiver side (i.e., remote communications node 102a-102b), but requires some architectural adjustments at the supervisory communications node 102 to deal with the pipeline issues resulting from "splitting" a DSSM packet and then having to "hold" one or more pieces while other packets are transmitted on some channels. Carefully reordering the steps at the supervisory communications node 106 can address this problem or the supervisory communications node 106 can use large buffers to provide the necessary delays.

Figure 2:
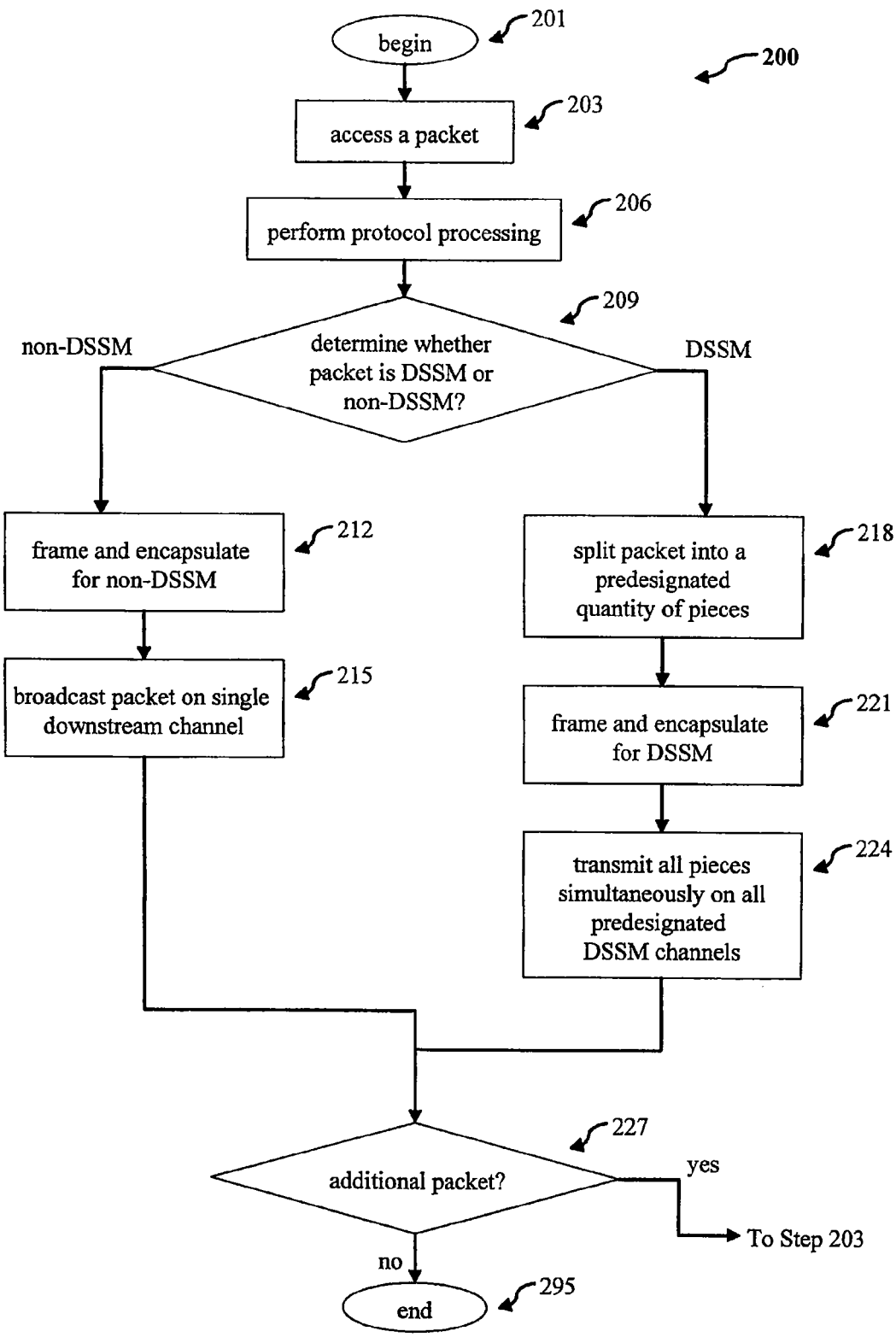
FIG. 2 illustrates an operational flow for transmitting downstream packets according to an embodiment of the present invention.
Figure 8:
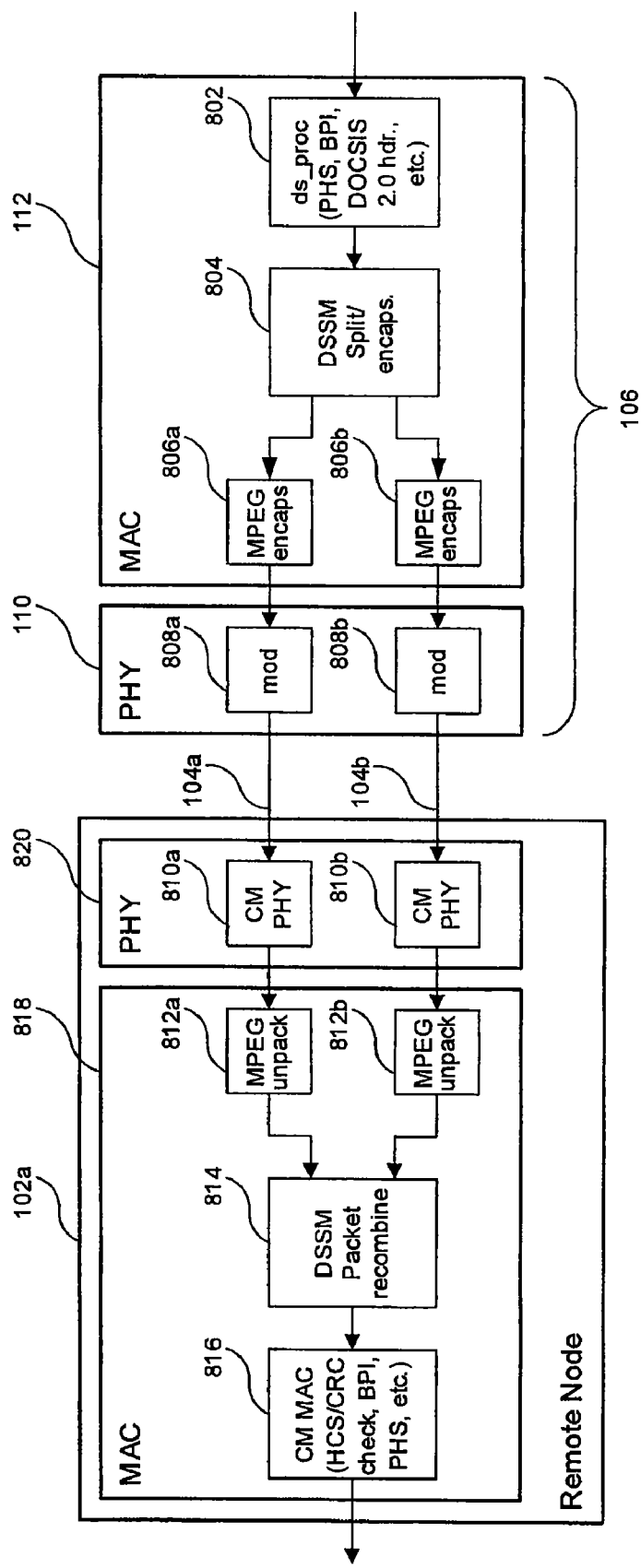
FIG. 8 illustrates a communications management system according to another embodiment of the present invention.

The control flows of FIGS. 2 and 6 can also be explained with reference to FIG. 8. More specifically, FIG. 8 illustrates an embodiment of a DSSM-capable remote communications node 102a, and a DS PHY 110 and a MAC 112 from supervisory communications node 102. FIG. 8 also shows two downstream channels 104a-104b from supervisory communications node 106 to the DSSM-capable remote communications node 102a. Although only two channels are shown, as discussed above, the quantity of channels can be more or less as desired by the system architect. Also, as discussed, one downstream channel can be a primary channel for receiving non-DSSM packets.

FIG. 8 shows various components of supervisory communications node 106 and the DSSM-capable remote communications node 102a for sending and receiving DSSM packets and non-DSSM packets in accordance with an embodiment of the present invention. As shown, MAC 112 includes a downstream protocol processor 802, a packet divider 804, and two encapsulators 806a-806b. Downstream protocol processor 802 performs protocol processing on packets received for the downstream. As discussed above with reference to step 206, protocol processing includes payload header suppression, DES encryption, and/or the like.

Upon completion of protocol processing, packet divider 804 takes the resulting packet (e.g., packet 304) and splits the packet into a predesignated quantity of pieces (e.g., pieces 304a-304d, 404a-404c), as discussed above with reference to step 218. The predesignated quantity of pieces matches the quantity of available downstream channels of internodal infrastructure 104. Since only two downstream channels 104a-104b are shown in FIG. 8, packet divider 804 would perform byte-level splitting, packet-level splitting, or the like to produce the two pieces.

Encapsulators 806a-806b frame and encapsulate the pieces, as discussed above with reference to step 221. Encapsulator 806a is dedicated to downstream channel 104a, and encapsulator 806b is dedicated to downstream channel 104b. Therefore if packet divider 804 produces and assigns a piece to downstream channel 104a, encapsulator 806a would create an encapsulation header to mark the piece for transmission over channel 104a. Likewise if packet divider 804 produces and assigns a piece to downstream channel 104b, encapsulator 806b would create an encapsulation header to mark the piece for transmission over channel 104b.

DS PHY 110 includes DS PHY 808a and DS PHY 808b, which form the physical layer interface between supervisory communications node 106 and downstream channels 104a and 104b, respectively. Packets from encapsulators 806a-806b are collected at PHY 808a-808b, respectively, and converted to a physical signal.

The physical signal is received at PHY 820, which forms the physical layer interface between the DSSM-capable remote communications node 102a and downstream channels 104a and 104b. PHY 820 includes PHY 810a, which receives physical signals from downstream channel 104a, and PHY 810b, which receives physical signals from downstream channel 104b. As discussed with respect to step 403, multiple pieces (e.g., pieces 304a-304d, or 404a-404c) of an original packet (e.g., packet 304) are independently received at PHY 810a-810b at substantially the same time.

The DSSM-capable remote communications node 102a also includes a MAC 818 that receives the downstream signals from PHY 820, and extracts voice, data, requests, and/or the like. MAC 818 includes two deframers 812a-812b, packet recombiner 814, and protocol processor 816. Deframer 812a is dedicated to downstream channel 104a, and deframer 812b is dedicated to downstream channel 104b. As such, deframer 812a receives, unpacks, and deframes packets that are received from PHY 810a, and deframer 812b receives, unpacks, and deframes packets that are received from PHY 810b.

Packet recombiner 814 receives packets from deframers 812a-812b and reassembles the pieces. As discussed at steps 606-615, packet recombiner 814 parses the encapsulation headers to reconstruct the original packet (e.g., packet 304) from the individual pieces (e.g., 304a-304b, 404a-404c).

Protocol processor 816 receives the resulting packet from packet recombiner 814, and performs protocol processing, as discussed at step 624. In an embodiment, a byte stream from packet recombiner 814 is delivered to protocol processor 816, while the packet is being reconstructed. This eliminates the need to buffer the entire packet before sending it to protocol processor 816.

It should be noted that the splitting (as performed by packet divider 804) and reassembly (as performed by packet recombiner 814) of the pieces take place right before and after, respectively, the MPEG framing (as performed by encapsulators 806a-806b and deframer 812a-812b). As a result, the protocol processor 816 sees a single input stream. In an embodiment using packet-level splitting, the splitting and encapsulating (e.g., framing and/or deframing) can be performed by the same component instead of two separate components as illustrated in FIG. 8.

As discussed above with reference to steps 618-624, the DSSM-capable remote communications node 102a can also receive and process non-DSSM packets. To implement this capability, downstream channel 104a can be designated as being the primary channel, such that only non-DSSM packets received on channel 104a are accepted. Non-DSSM packets received on channel 104b are ignored. A non-DSSM packet received at packet divider 804 is not split into pieces, but passed onto encapsulator 806a. Encapsulator 806a would create an encapsulation header that marks the packet as being a non-DSSM packet. PHY 808a would pass a physical signal embodying the packet to PHY 810a. PHY 810a would receive the physical signal, and deliver the non-DSSM packet to deframer 812a. Deframer 812a unpacks and deframes the non-DSSM packet, and packet recombiner 814 would parse the encapsulation header that identifies it as being a non-DSSM packet. As such, packet recombiner 814 would pass the non-DSSM packet to protocol processor 816.

III. Scheduling

In an embodiment of the present invention, a mechanism is provided to efficiently "schedule" the transmission of non-DSSM packets (e.g., legacy packets) around DSSM packets. As discussed with reference to FIG. 1, internodal infrastructure 104 includes four downstream channels. In and embodiment, transmitting a DSSM packet requires the use of all four channels. Therefore, the timing of DSSM transmissions affects the availability of a channel for non-DSSM-capable remote communications nodes 102c-102d on all four channels. This leads to a "scheduling" problem within supervisory communications node 106 in determining when to transmit which type of packet.

Figure 9:
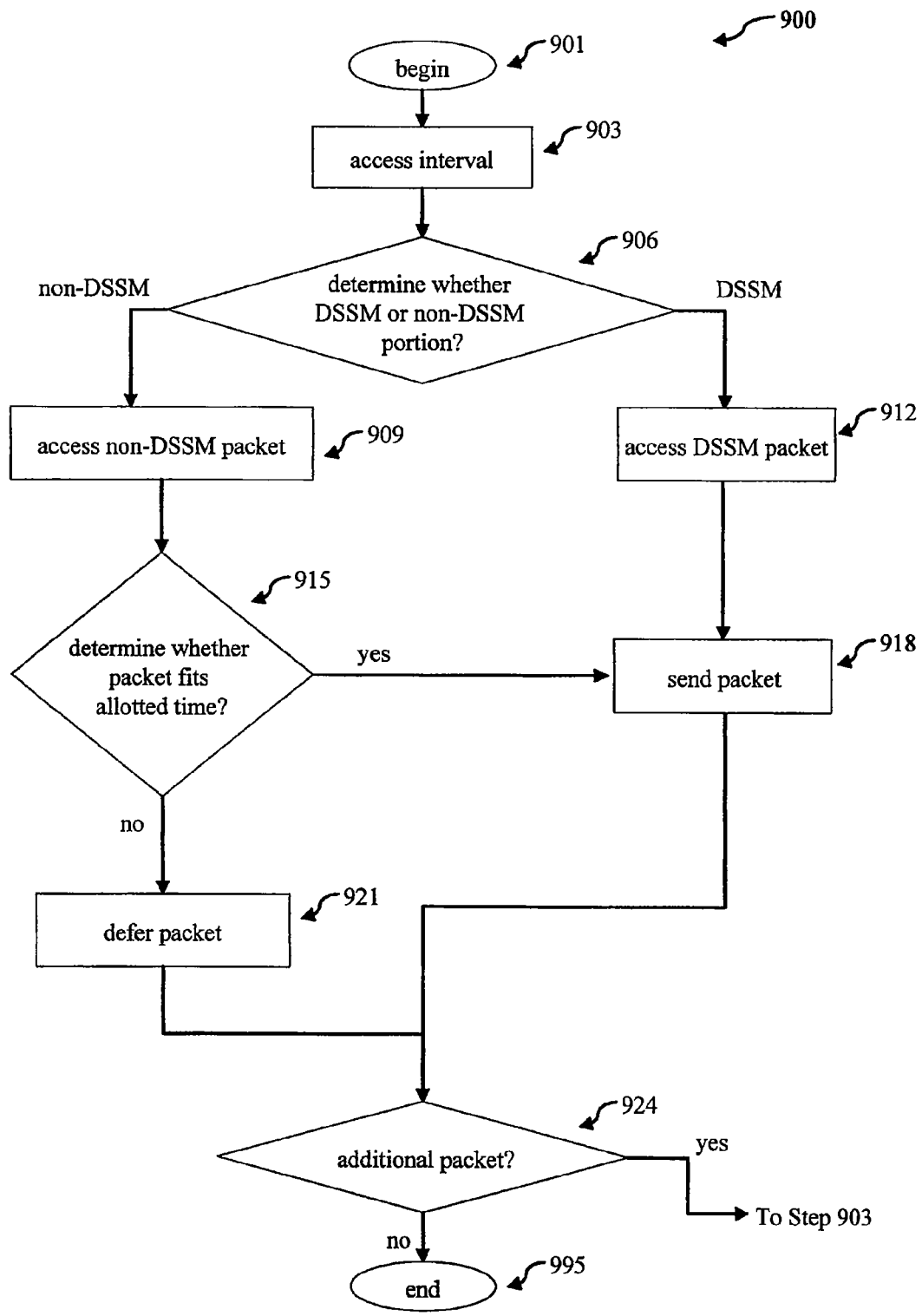
FIG. 9 illustrates an operational flow for downstream scheduling according to an embodiment of the present invention.

Referring to FIG. 9, flowchart 900 represents the general operational flow of an embodiment of the present invention for downstream scheduling. More specifically, flowchart 900 shows an example of a control flow for using MAP intervals to schedule the downstream.

The control flow of flowchart 900 begins at step 901 and passes immediately to step 903. At step 903, the interval parameters are accessed for defining MAP intervals for the downstream. In an embodiment, a "MAP-like" structure is imposed on the downstream within supervisory communications node 106, only. There is no need to transmit a downstream MAP to remote communications nodes 102a-102d, because the encapsulation header, discussed above, automatically lets the remote communications nodes 102a-102d know what type of packet it is receiving. Therefore, the downstream MAP is a conceptual tool to be used to think about how to partition downstream bandwidth.

Using this concept, the downstream may be thought of as being broken into a series of "MAP intervals," which are probably best imagined as of fixed duration—perhaps some interval relating to common VOIP packetization (e.g., 5 or 10 milliseconds). Each MAP interval is divided into two "chunks":

one for non-DSSM transmissions and one for DSSM transmissions. The relative size of these allocations can be changed from interval to interval, but each "chunk" always is contiguous (i.e., the first X % of the interval is devoted to non-DSSM-capable remote communications nodes 102c-102d, then the remaining (100-X) % is used for DSSM transmissions). It is also possible to allocate 100% of the channel to DSSM-capable remote communications nodes 102a-102b. If so configured, supervisory communications node 106 would ignore "interval" boundaries and send DSSM packets all the time.

As such, at step 903, a software application (e.g., software application 120) at supervisory communications node 106 would determine the MAP "interval" from the aforementioned interval parameters (e.g., interval duration, chunk percentage, etc.), and program it into MAC 112. The units can be timestamp counts or a similar convenient reference. Rate-shaping software (at, for example, software application 120) would let MAC 112 know on a regular basis (perhaps via an in-line "management message" as part of the data flow) what fraction of an interval to devote to each type of traffic.

Once the interval starts, it is determined, at step 906, whether the DSSM or non-DSSM portion of the interval is present. If the interval is currently in the non-DSSM portion, the control flow passes to step 909.

At step 909, a non-DSSM packet (e.g., legacy packet) is accessed and examined for transport over a primary channel. At step 915, it is determined whether the packet fits in the allotted time. If the packet fits the allotted time, then at step 918, the packet is sent over the appropriate channel. If there is not enough time remaining in the "non-DSSM fraction" of the interval to send the non-DSSM packet, then at step 921, the packet is deferred until the start of the next non-DSSM interval.

At step 924, the next packet is fetched and steps 906, 909, and 915-921 are repeated if additional non-DSSM packets are available. If no additional packets are available, the control flow ends as indicated by step 995 until the DSSM portion of the interval begins.

Once the DSSM portion of the interval begins at step 906, the control flow passes to step 912. At step 912, a DSSM packet is accessed and divided into pieces for transport over all available downstream channels. At step 918, the packet pieces are sent over the multiple downstream channels. At step 924, the next packet is fetched and steps 906, 912, and 918 are repeated if additional DSSM packets are available. If no additional packets are available, the control flow ends as indicated by step 995 until the non-DSSM portion of the interval begins.

To increase efficiency, "fragmentation" is introduced, in an embodiment, into the DSSM downstream, so that if the next DSSM packet in the queue cannot be transmitted by the end of the interval, the first part of it can be transmitted and the remainder sent during the next interval. This would guarantee that none of the "DSSM chunk" of the interval is wasted.

In an embodiment, the rate-shaping software (e.g., software application 120) adjusts the interval proportions based on monitoring of queue depths, knowledge of bandwidth allocated to admitted flows on remote communications nodes 102a-102d of each type (e.g. make sure there is enough legacy time to carry all active phone calls on these devices), and other system parameters.

Figure 10:
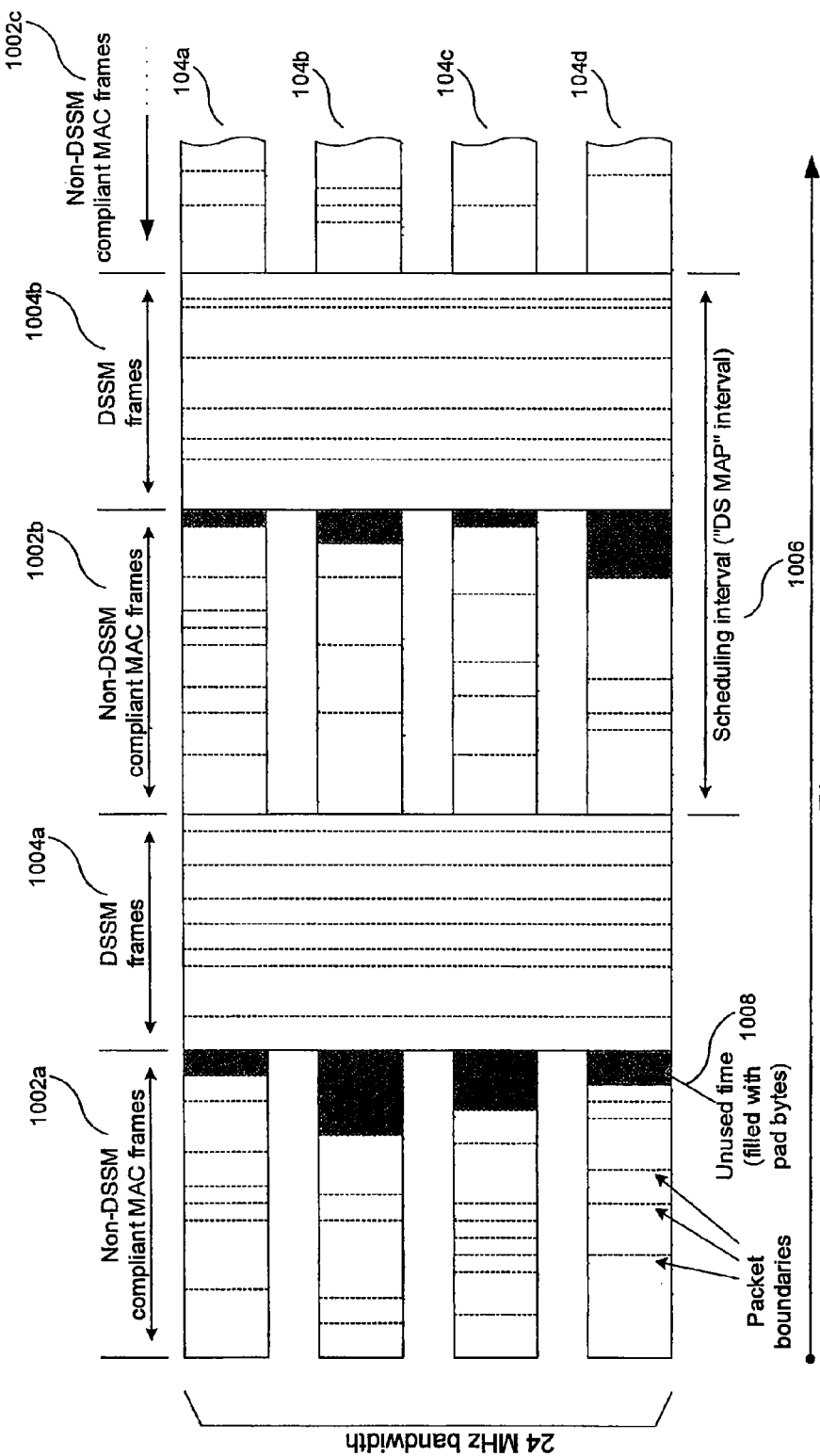
FIG. 10 illustrates the scheduling of non-DSSM and DSSM packets, according to an embodiment of the present invention.

FIG. 10 illustrates the combining of non-DSSM and DSSM packets according to an embodiment of the present invention. As discussed, a scheduling interval 1006 includes a non-DSSM portion 1002 (shown as 1002a-1002c) and a DSSM portion 1004 (shown as 1004a-1004b). As shown, DSSM portions 1004a-1004b of the scheduling interval 1006 are used to send four pieces of a packet over the four available downstream channels 104a-104d. Non-DSSM portions 1002a-1002c are used to schedule the transmission of non-DSSM packets, such as legacy packets. Any unused time 1008 on a downstream channel 104a-104d can be filled with pad bytes.

In an embodiment, for instance, when packet-level splitting is used per FIG. 4, legacy and DSSM traffic may be combined such that during a given time interval, some channels may be carrying DSSM traffic while other channels are carrying legacy traffic. FIG. 13 illustrates this approach. In the illustration, a "scheduling interval" corresponds to the duration of one MPEG packet. Within a scheduling interval, the headend (e.g., supervisory communications node 106) may choose to transmit DSSM data on some, all, or none of the available channels, and may choose to send legacy data on those channels not carrying DSSM data. In an embodiment, this decision may be made based on relative data priority, queue size, or any of a number of other considerations.

As discussed, using "MAP-like" structures is one approach to efficiently scheduling transmissions of non-DSSM packets around DSSM packets over the same downstream channels. In another embodiment, scheduling is based on the dynamic use of downstream channels on a per-packet basis. For example, a given DSSM packet can be divided among two, three, or all four downstream channels. The next packet can be divided among a different number of channels and/or use the channels in a different order, and the next could be different still, and so forth.

Figure 11:
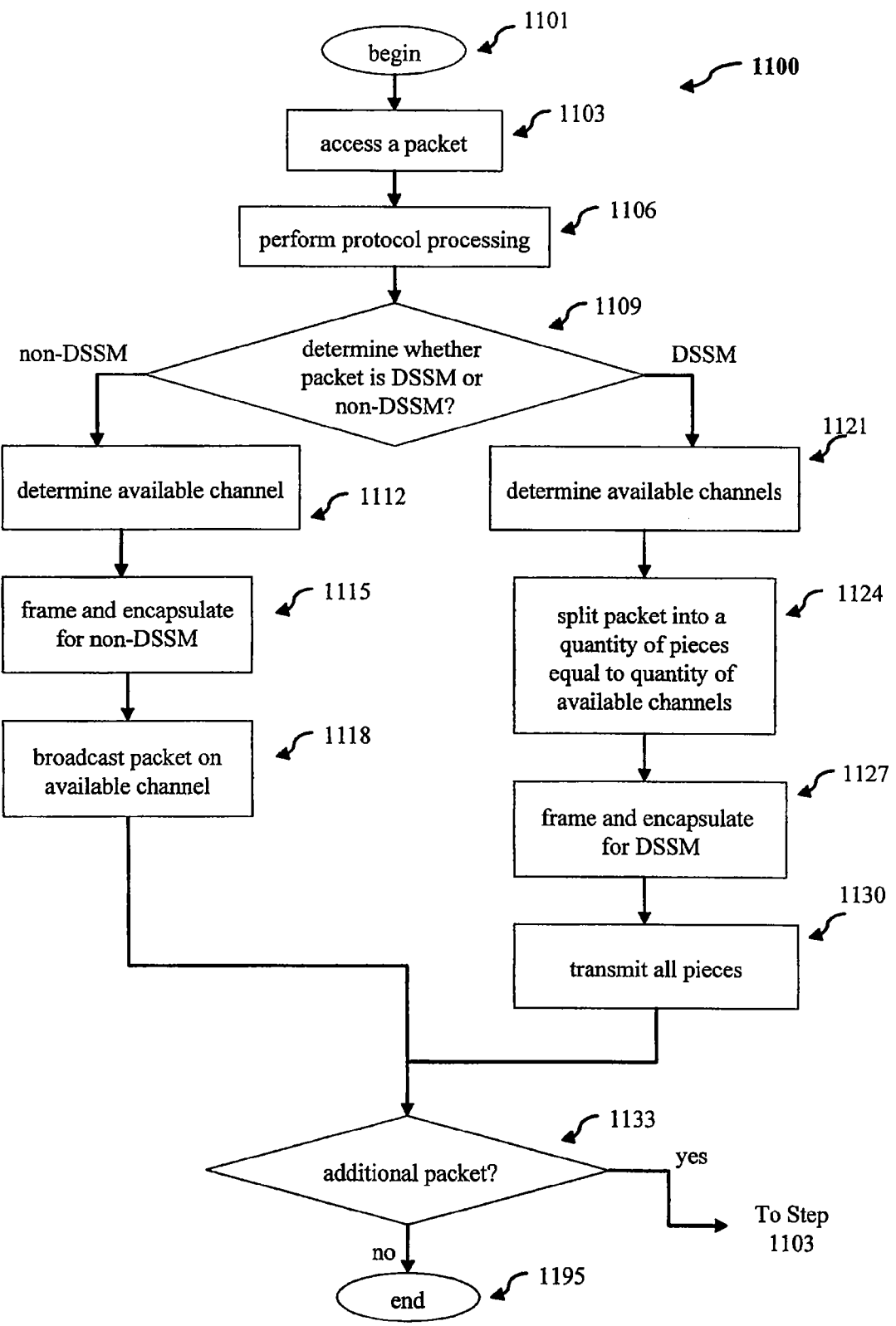
FIG. 11 illustrates an operational flow for dynamic downstream scheduling according to an embodiment of the present invention.

Referring to FIG. 11, flowchart 1100 represents the general operational flow of another embodiment of the present invention for downstream scheduling. More specifically, flowchart 1100 shows an example of a control flow for dynamically scheduling the downstream.

The control flow of flowchart 1100 begins at step 1101 and passes immediately to step 1103. At step 1103, a packet is accessed for downstream transmission. At step 1106, protocol processing is performed on the packet as discussed above. At step 1109, it is determined whether the packet is a DSSM packet or a non-DSSM packet. If the packet is determined to be a non-DSSM packet, the control flow passes to step 1112. If, on the other hand, the packet is determined to be a DSSM-packet, the control flow passes to step 1121.

At step 1112, it is determined which channel the non-DSSM packet will be sent and whether that channel is available for broadcasting the non-DSSM packet. In an embodiment, the packet is held until that channel becomes available.

At step 1115, the non-DSSM packet is framed and encapsulated with a non-DSSM encapsulation header, as discussed above. At step 1118, the non-DSSM packet is broadcast over the selected channel to remote communications nodes 102a-102b and to remote communications nodes 102c-102d as may be on the selected channel, and at step 1133, it is determined whether additional packets are available.

At step 1121, the available downstream channels are determined for sending a DSSM packet. At step 1124, the packet is split into the same number of pieces as there are available channels. For example, if only two of the four downstream channels 104a-104d (shown in FIG. 10) are determined to be available at step 1121, the packet from step 1103 is divided into two pieces at step 1124.

In an embodiment discussed above, a "channel number" is provided in the FC_PARM field 314 of the encapsulation header for each piece. The channel number is also referred to as a "piece number," with piece number 0, 1, 2, 3 indicating the order in which bytes are to be reassembled. One more bit is added to the header as a "last piece" flag which tells the receiving remote communications node 102a-102b how many pieces the packet got divided into and hence how many channels are being used. Therefore, if the packet has been divided into two pieces, the first piece is denoted as "piece 0" and the second piece is denoted as "piece 1," and the "last piece" flag is set in piece 1 to indicate that only two pieces are being used.

At step 1130, the two pieces are sent on the two available downstream channels, and at step 1133 it is determined whether additional packets are available. If additional packets are available, the control flow returns to step 1103. Otherwise, the control flow ends as indicated by step 1195.

If at step 1121, it is determined that all four downstream channels 104a-104d are available for sending the next DSSM packet, the packet is broken into pieces number 0, 1, 2, and 3, and the "last piece" bit is set on piece 3. Thus, the receiving DSSM-capable remote communications node 102a-102b can tell "on the fly" how many channels are being used for a given packet, and any combination of the four channels can be used in any order. As such, the present invention enables dynamic channel usage on a per-packet basis for DSSM packets.

The present invention also implements the concept of downstream fragmentation. As opposed to "pieces," which are sent simultaneously on all channels, "fragments" are separated in time. At supervisory communications node 106, "fragmentation" occurs before division into "pieces." For example, the DOCSIS™ 2.0 PDU can be separated into say two fragments. The first fragment can be divided into pieces with each piece having its own encapsulation header. These pieces are transmitted at the same time on two downstream channels. Some intervening time interval can pass, perhaps so that some legacy packets can be sent (but not other DSSM packets). Following the intervening time interval, the second fragment is divided into pieces with their own encapsulation headers. These pieces are also transmitted over the available downstream channels. It should be understood, however, that the downstream fragmentation of the present invention does not require the ability to send legacy packets between fragments.

Since DSSM fragments must be sent in order and all fragments for one DSSM packet must be sent before starting the next, only two bits are needed in the encapsulation header: one that says "this is a fragment" and one that says "this fragment is the last fragment." These bits would be included (and be identical) on all "pieces" of the fragment. If any fragments are lost, the reassembled packet would fail CRC and HCS, so a sequence number with checking is not necessary. To minimize overhead, the necessary two bits can be put in the FC_PARM field 314. If more bits turn out to be necessary, an EHDR (e.g., EHDR field 316) can be used, which may increase the overhead.

If non-DSSM packets are not supported between DSSM fragments, the receiving remote communications node 102a-102b reconstructs the pieces as usual, and it is not necessary for supervisory communications node 106 to signal an "end-of-packet" on fragments until it finishes processing a fragment with the "last" flag set. If, on the contrary, non-DSSM packets between fragments are supported, the receiving remote communications node 102a-102b needs the ability to save a "state" while it processes a DSSM packet, process a non-DSSM packet, and then restore the saved state so that it can resume the processing of the DSSM packet.

Figure 12A:
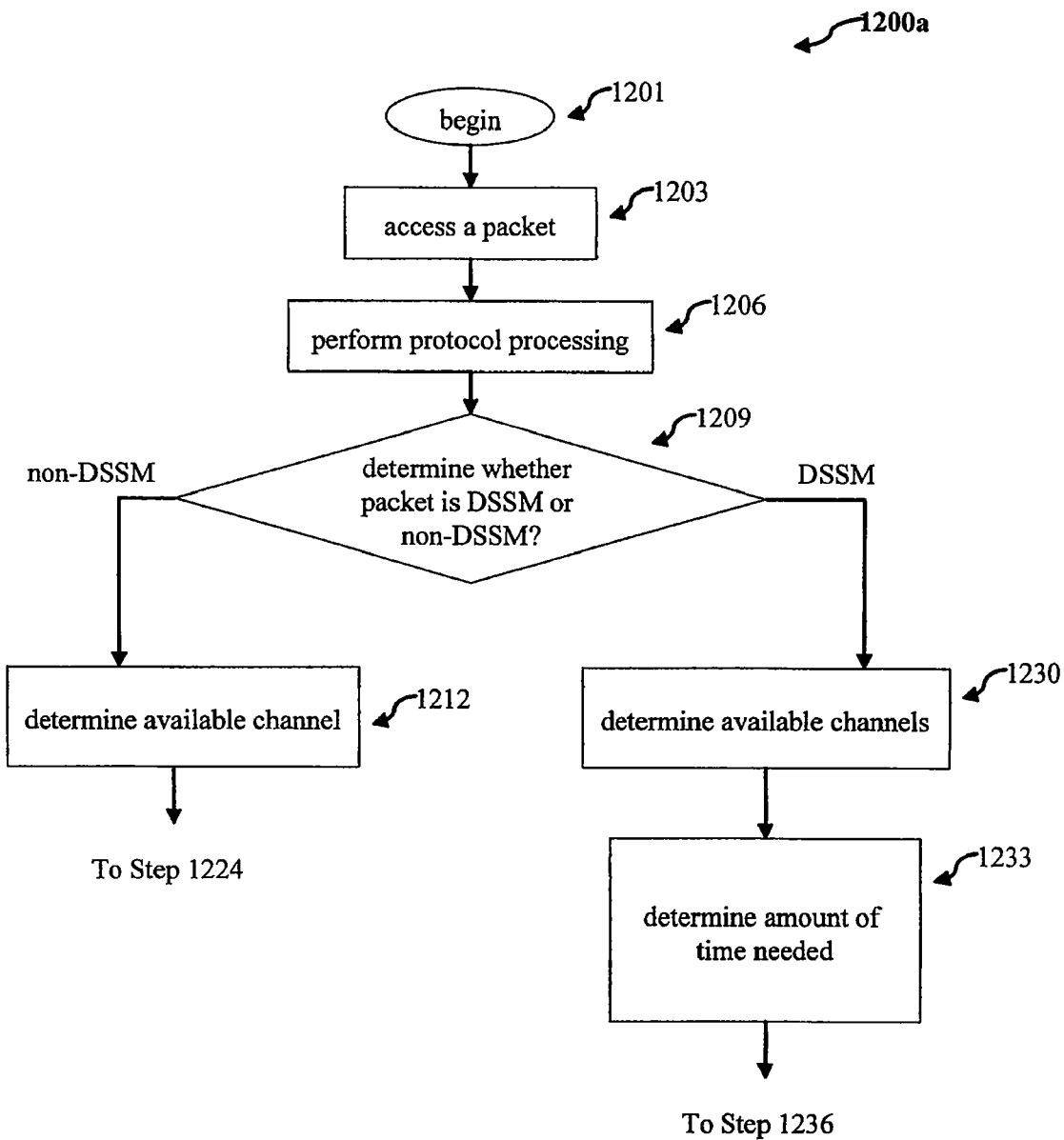
FIGS. 12a-12c illustrate an operational flow for dynamic downstream scheduling according to another embodiment of the present invention.
Figure 12B:
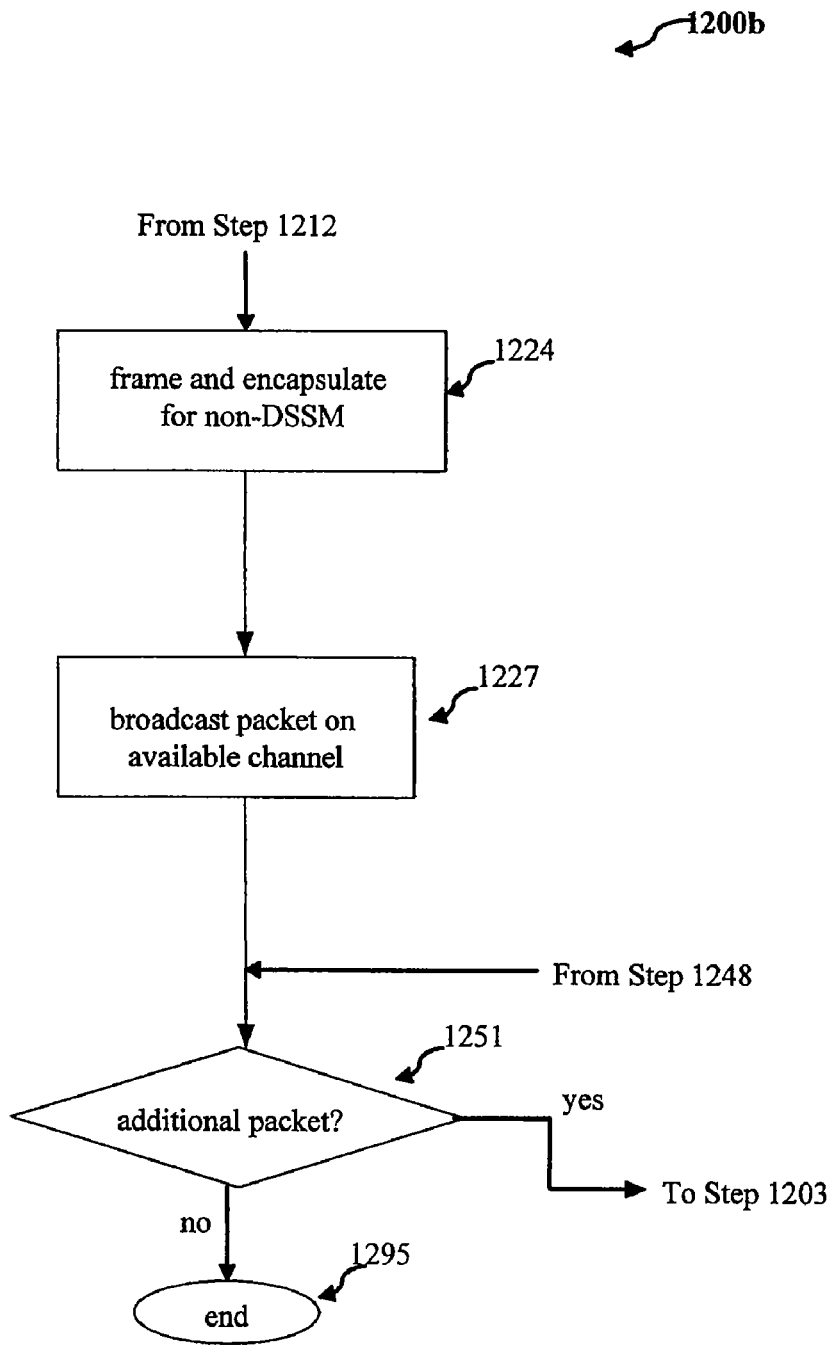
Figure 12C:
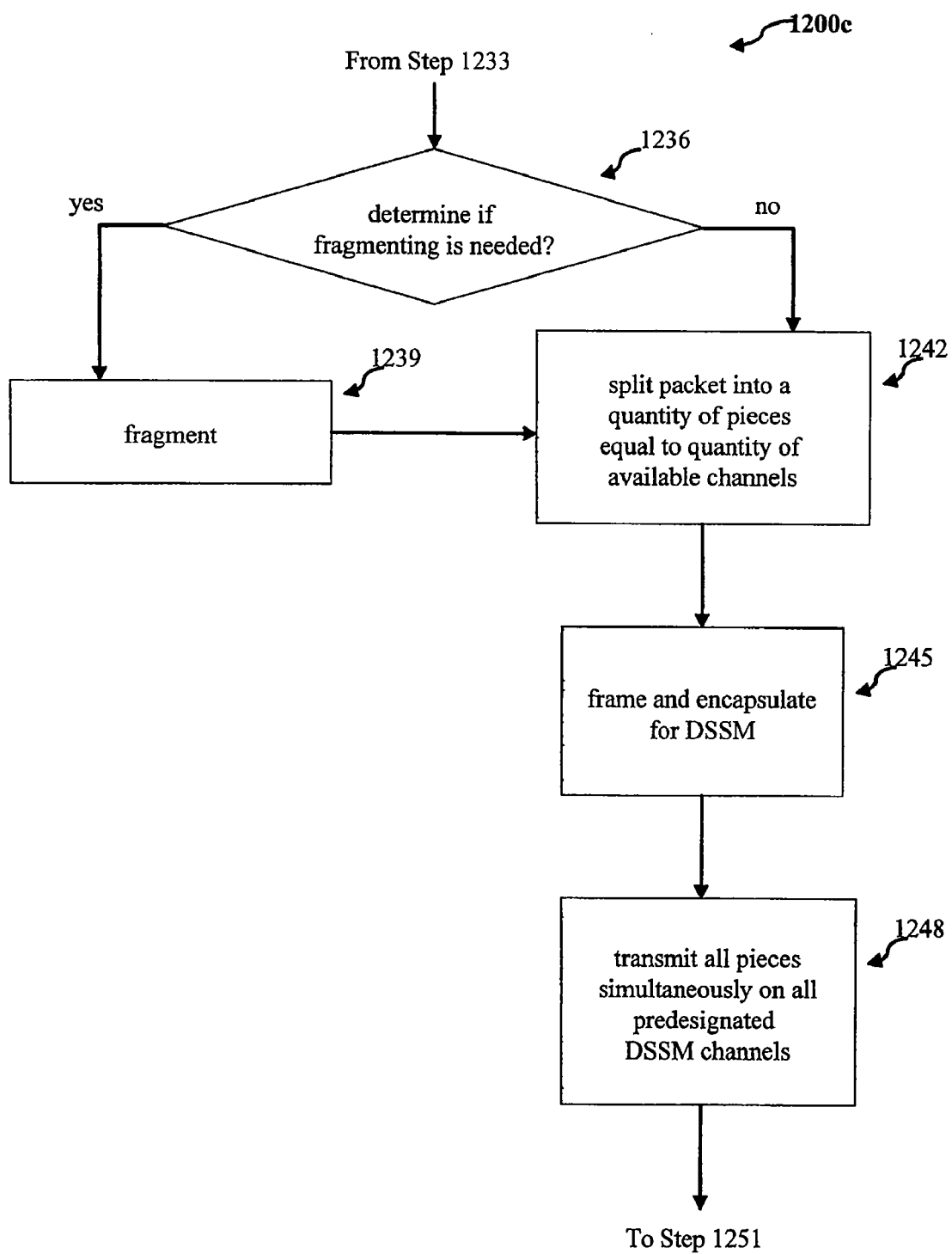

Referring to FIGS. 12a-12c, flowchart 1200 (shown as 1200a-1200c) represents the general operational flow of another embodiment of the present invention for downstream scheduling. More specifically, flowchart 1200 shows an example of a control flow for dynamically scheduling the downstream with fragmentation.

The control flow of flowchart 1200 begins at step 1201 and passes immediately to step 1203. At step 1203, a packet is accessed for downstream transmission. At step 1206, protocol processing is performed. If at step 1209, the packet is determined to be a non-DSSM packet, the control flow passes to step 1212. Otherwise, at step 1209, the control flow for a DSSM packet passes to step 1230.

At step 1212, it is determined which channel the non-DSSM packet is to be sent and whether that downstream channel is available for sending the non-DSSM packet. In an embodiment, the packet is held until that channel is available.

At step 1224, the packet is framed and encapsulated as a non-DSSM packet. At step 1227, the packet is broadcast to all remote communications nodes 102. At step 1251, the control flow is returned to step 1203 if additional packets are available.

If at step 1209, a DSSM packet is detected, the control flow passes to step 1230. At step 1230, it is determined which downstream channels are available for the DSSM packet. At step 1233, it is determined how much time is needed to send the packet if it was split into a quantity of pieces matching the quantity of available channels. For example, if two channels are available, it is determined how much time is needed to send two pieces.

Based on the amount of time needed, it is determined at step 1236 whether fragmentation is necessary to send the packet after it is subsequently divided into the predetermined quantity of pieces (i.e., matching the quantity of available downstream channels). If there is sufficient time to send the packet pieces (unfragmented) over the available downstream channels, the packet is divided into the predetermined quantity of pieces at step 1242. At step 1045, each piece is framed and encapsulated with its own encapsulation header marking the piece as a DSSM packet. At step 1248, all packet pieces are sent simultaneously on the available downstream channels to the remote communications nodes 102. At step 1251, the control flow is returned to step 1203 if additional packets are available.

If, at step 1236, it is determined that there is insufficient time to send the packet pieces (unfragmented) over the available downstream channels, the packet is fragmented at step 1239. At step 1242, the first fragment is divided into the predetermined quantity of pieces. At step 1245, the pieces are framed and encapsulated, and at step 1248, all pieces are sent simultaneously on the available downstream channels. At step 1251, the control flow returns to step 1203 so that the remaining fragment(s) can eventually be sent. In an embodiment, if an intervening non-DSSM packet has been scheduled for a downstream channel, the remaining fragment(s) are either sent after the intervening non-DSSM packet, or divided at step 1242 into a lesser quantity of pieces for transmission over the downstream channels that are presently available. Otherwise, the control flow would skip 1230 and the remaining fragment is sent immediately unless additional fragmenting is required.

For example, assume that supervisory communications node 106 would like to send a DSSM packet. Referring to FIG. 12a at step 1230, it may decide that channels B and C are open, but channels A and D are in the middle of transmitting non-DSSM packets. Further assume that channels B and C both allow 64 byte times to complete a transmission.

Therefore, at step 1239, the DSSM packet is fragmented so that the first fragment would contain 116 bytes of data. Then, at step 1242, the first fragment is divided into two pieces (each of which turns out to be 64 bytes long after encapsulation) and, at step 1248, the two pieces are sent on channels B and C.

Further assume that at the moment that transmission of the first fragment completes on channels B and C, the non-DSSM transmissions on channels A and D also are completed. Now, all four channels are determined to be available at step 1230. So, at step 1242, the second fragment of the DSSM packet is divided into four pieces, and at step 1248, the four pieces are sent on all four downstream channels.

If, thereafter, at step 1212, a high-priority legacy packet needs to be sent on channel A, then after the DSSM packet completes, the legacy packet could broadcast on downstream channel A at step 1227, while channels B, C, and D could be used to carry the next DSSM packet at step 1248. Once all packets have been transmitted, the control flow ends as indicated by step 1295.

Thus, the present invention allows all four downstream channels to stay completely full at all times. It also enables supervisory communications node 106 (via, e.g., software application 120) to specify that certain DSSM packets should only use certain channels. Supervisory communications node 106 can enable or disable the use of certain channels for DSSM at certain times (e.g., it can be configurable to reserve one millisecond out of every five milliseconds for, e.g., legacy voice traffic on channel A only, or any other desired configurations).

At the receiving remote communications nodes 102, the present invention combines dynamic channel usage and fragmentation to use space on each channel as available, without the requirement that all channels must be "cleared" of non-DSSM packets before a DSSM packet can begin. With fragmentation, part of the packet can be sent over a smaller number of channels than the rest of the packet.

IV. Management/OSS

In order for the communications management system 100 of the present invention to be (a) backwards compatible, and (b) usable, it must be manageable. DSSM-capable remote communications nodes 102a-102b must be able to determine what mode to operate, advertise their capabilities, and understand which channels to use.

In an embodiment, a DSSM-capable remote communications nodes 102a-102b operates similarly to a DOCSIS™ 2.0 cable modem up to a particular point (i.e., scanning, upstream channel descriptor (UCD) selection, SYNC, ranging, dynamic host configuration protocol (DHCP), time of day (ToD) server, trivial file transfer protocol (TFTP)). During DHCP, the DSSM-capable remote communications nodes 102a-102b would advertise DSSM support in Option 60.

The DSSM-capable remote communications nodes 102a-102b then sends a REG-REQ message to the supervisory communications node 106, just as a DOCSIS™ 2.0 modem would, but it advertises DSSM support in the REG-REQ message as well (e.g., in the modem capabilities type/length value (TLV) tuple). A non-DSSM-capable supervisory communications node 106 would ignore the setting and return a normal REG-RSP. The DSSM-capable remote communications nodes 102a-102b would send a REG-ACK, start baseline privacy interface (BPI) and operate in a non-DSSM mode (e.g., legacy mode).

A DSSM-capable supervisory communications node 106 would see the setting in the REG-REQ, and send TLVs in the REG-RSP telling the DSSM-capable remote communications nodes 102a-102b where the additional downstream frequencies are. The DSSM-capable remote communications nodes 102a-102b would parse the TLVs, activate DSSM mode in the hardware (e.g., tune the tuner, etc,), and then send a REG-ACK to indicate to the supervisory communications node 106 that it can begin sending traffic downstream to the DSSM-capable remote communications nodes 102a-102b in DSSM mode.

The present invention provides several advantages. Since DSSM-capable remote communications nodes 102a-102b and non-DSSM-capable remote communications nodes 102c-102d can coexist in the same channel, communications management system 100 improves network performance (especially, in the downstream). In addition, communications management system 100 increases throughput on, for example, a single remote communications node 102 with minimal to no cost increase, provides excellent backwards compatibility, greater network efficiency due to stat muxing across two types of remote communications nodes 102, and a smooth migration path (e.g., no need to dedicate large amounts of bandwidth to a small number of DSSM-capable remote communications nodes 102a-102b while deployment is in progress). Communications management system 100 also has a very low die area in comparison with conventional approaches. However, the present invention may require the die area for the digital part of the receiving DSSM-capable remote communications nodes 102a-102b to be quadrupled in size. The present invention also enables a single stream to be presented to the MAC and network layers, thereby removing problems of IP addressing, packet ordering, or the like.

V. Exemplary System Implementation

FIGS. 1-12c are conceptual illustrations allowing an easy explanation of the present invention. It should be understood that embodiments of the present invention could be implemented in hardware, firmware, software, or a combination thereof. In such an embodiment, the various components and steps would be implemented in hardware, firmware, and/or software to perform the functions of the present invention. That is, the same piece of hardware, firmware, or module of software could perform one or more of the illustrated blocks (i.e., components or steps).

In this document, the terms "computer program medium" and "computer usable medium" are used to generally refer to media such as a removable storage unit, a hard disk installed in hard disk drive, and signals (i.e., electronic, electromagnetic, optical, or other types of signals capable of being received by a communications interface). These computer program products are means for providing software to a computer system. The invention, in an embodiment, is directed to such computer program products.

In an embodiment where aspects of the present invention is implemented using software, the software can be stored in a computer program product and loaded into computer system using a removable storage drive, hard drive, or communications interface. The control logic (software), when executed by a processor, causes the processor to perform the functions of the invention as described herein.

In another embodiment, aspects of the present invention are implemented primarily in hardware using, for example, hardware components such as application specific integrated circuits (ASICs). Implementation of the hardware state machine so as to perform the functions described herein will be apparent to one skilled in the relevant art(s).

In yet another embodiment, the invention is implemented using a combination of both hardware and software.

While various embodiments of the present invention have been described above, it should be understood that they have been presented by way of example, and not limitation. It will be apparent to one skilled in the relevant art(s) that various changes in form and detail can be made therein without departing from the spirit and scope of the invention. Moreover, it should be understood that the method, system, and computer program product of the present invention could be implemented in any multi-nodal communications environment governed by centralized nodes. The nodes include, but are not limited to, cable modems, set-top boxes, and headends, as well as communication gateways, switches, routers, Internet access facilities, servers, personal computers, enhanced telephones, personal digital assistants (PDA), televisions, or the like. Thus, the present invention should not be limited by any of the above-described exemplary embodiments, but should be defined only in accordance with the following claims and their equivalents.

What is claimed is:

1. A method for communicating a packet within a communications system having a plurality of channels, comprising:
   determining, by a communications transmitter, whether the packet is destined for a single channel capable remote communications node or a synchronous multichannel capable remote communications node; and
   if the packet is destined for the single channel capable remote communications node,
   transmitting the packet on a single channel from among the plurality of channels, and
   if the packet is destined for the synchronous multichannel capable remote communications node,
   splitting the packet into a predesignated quantity of pieces, and
   transmitting each piece from among the predesignated quantity of pieces over a different channel from among the plurality of channels.

2. The method according to claim 1, wherein the step of splitting the packet comprises:
   determining a number of available channels from among the plurality of channels for transporting the packet; and
   splitting the information into the predesignated quantity of pieces equal to the number of available channels.

3. The method of claim 1, wherein the step of splitting the packet comprises:
   splitting the packet into the predesignated quantity of pieces based upon a number of available channels from among the plurality of channels.

4. The method of claim 1, wherein the step of splitting the packet comprises:
   byte-level splitting the packet to produce the predesignated quantity of pieces.

5. The method of claim 4, wherein the step of byte-level splitting the packet comprises:
   dividing the packet over one or more available channels from among the plurality of channels in an order the packet was received.

6. The method of claim 4, wherein the step of byte-level splitting the packet comprises:
   dividing the packet into a plurality of bytes, wherein each byte is a protocol data unit (PDU) of one or more available channels from among the plurality of channels.

7. The method of claim 1, wherein the step of splitting the packet comprises:
   packet-level splitting the packet to produce the predesignated quantity of pieces.

8. The method of claim 7, wherein the step of packet-level splitting the packet comprises:
   dividing the packet into a plurality of packets, wherein each packet is a protocol data unit (PDU) of one or more available channels from among the plurality of channels.

9. The method of claim 8, wherein the step of dividing the packet comprises:
   dividing the packet into a plurality of MPEG packets.

10. The method of claim 1, further comprising:
    identifying the packet destined for the single channel capable remote communications node as a non-multichannel packet-type.

11. The method of claim 10, wherein the step of identifying the packet comprises:
    framing and encapsulating the packet as the non-multichannel packet-type.

12. The method of claim 11, wherein the step of framing and encapsulating the packet comprises:
    producing an encapsulation header to mark the packet as being the non-multichannel packet-type.

13. The method of claim 1, further comprising:
    assigning each of piece to a corresponding available channel from the plurality of channels.

14. The method of claim 13, wherein the step of transmitting each piece over the different channel comprises:
    transmitting each piece over the corresponding available channel.

15. The method according to claim 13, wherein the step of assigning each of the pieces comprises:
    producing an encapsulation header to denote the corresponding available channel.

16. The method of claim 13, wherein the step of assigning each of the pieces comprises:
    framing and encapsulating each piece as a multichannel packet-type.

17. The method of claim 16, wherein the step of framing and encapsulating each of the pieces comprises:
    producing an encapsulating header to designate an available channel from among the plurality of channels for each piece.

18. The method of claim 17, further comprising:
    accessing information for transport over the plurality of channels to provide the packet.

19. The method of claim 1, wherein the step of transmitting each piece over the different channel comprises:
    transmitting the packet on two or more channels from among the plurality of channels to one or more remote communications nodes.

20. A method for communicating a packet within a communications system having a plurality of channels, comprising:
    (a) identifying, by a first device, at least two available channels from among the plurality of channels that are to be used to transmit the packet;
    (b) determining an amount of time needed to transmit first predesignated pieces of the packet to a second device over the at least two available channels;
    (c) fragmenting the packet when it is determined that there is insufficient time to transmit the first predesignated pieces;
    (d) splitting fragments of the packet into second predesignated pieces; and
    (e) transmitting the second predesignated pieces to the second device over the at least two available channels when.

21. The method of claim 20, wherein step (a) comprises:
(a)(i) receiving an indication that the second device is capable of receiving the first predesignated pieces; and
(a)(ii) sending a location of the at least two available channels channels to the second device.

22. The method of claim 21, wherein step (a)(i) comprises:
(a)(i)(A) receiving the indication via a REG-REQ message from the second device.

23. The method of claim 21, wherein step (a)(ii) comprises:
(a)(ii)(A) sending a REG-RSP message to the second device.

24. The method of claim 21, wherein step (b) comprises:
(b)(i) receiving an acknowledgement from the second device that the second device is capable of receiving the predesignated pieces; and
(b)(ii) transmitting the predesignated pieces to the second device in response to the acknowledgement.

25. The method of claim 24, wherein step (b)(i) comprises:
(b)(i)(A) receiving a REG-ACK message from the second device.

26. The method of claim 20, wherein step (a) comprises:
(a)(i) setting a program identifier (PID) field of the packet to indicate that the predesignated pieces are to be transmitted via the one or more channels.

27. The method of claim 20, wherein step (d) comprises:
(d)(i) byte-level splitting the fragments of the packet to produce the second predesignated pieces.

28. The method of claim 20, wherein step (d) comprises:
(d)(i) framing and encapsulating the second predesignated pieces as a multichannel packet-type.

29. The method of claim 28, wherein step (d)(i) comprises:
(d)(i)(1) producing an encapsulating header to designate an available channel from among the at least two available channels that the pieces have been assigned.

30. The method of claim 20, wherein a quantity of the first predesignated pieces is equal to a quantity of the at least two available channels.

31. The method of claim 20, further comprising:
(f) repeating steps (d) through (e) until the packet has been transmitted to the second device.

32. The method of claim 20, further comprising:
(f) splitting the packet into the first predesignated pieces when it is determined that there is insufficient time to transmit the first predesignated pieces; and
(g) transmitting the first predesignated pieces to the second device over the at least two available channels.

33. The method of claim 32, wherein step (f) comprises:
(f)(i) packet-level splitting the packet to produce the first predesignated pieces.

34. The method of claim 20, wherein step (e) comprises:
(e)(i) simultaneously transmitting the second predesignated pieces to the second device over the at least two available channels.

35. The method of claim 20, further comprising:
(f) determining whether the packet is destined for a single channel capable remote communications node or a synchronous multichannel capable remote communications node; and
(g) performing steps (a) through (e) when the packet is destined for the synchronous multichannel capable remote communications node.

36. The method of claim 20, further comprising:
(f) determining whether the packet is destined for a single channel capable remote communications node or a synchronous multichannel capable remote communications node; and
(g) transmitting the packet on an available channel from among the plurality of channels when the packet is destined for the single channel capable remote communications node.

* * * * *

UNITED STATES PATENT AND TRADEMARK OFFICE
CERTIFICATE OF CORRECTION

| | | |
|---|---|---|
| PATENT NO. | : 8,130,642 B2 | Page 1 of 1 |
| APPLICATION NO. | : 12/258585 | |
| DATED | : March 6, 2012 | |
| INVENTOR(S) | : Daniel H. Howard | |

It is certified that error appears in the above-identified patent and that said Letters Patent is hereby corrected as shown below:

Title Page, Item (75), Inventor Section, "John D. Horton" should read -- John D. Horton, Jr. --

Title Page, Item (75), Inventor Section, "Thomas J. Quigley, Jr" should read -- Thomas J. Quigley --

In the Claims:

Column 22, line 23, delete "of."

Column 22, line 67, delete "when."

Signed and Sealed this
Thirteenth Day of August, 2013

Teresa Stanek Rea
*Acting Director of the United States Patent and Trademark Office*